United States Patent [19]

Kagawa et al.

[11] Patent Number: 5,451,257
[45] Date of Patent: Sep. 19, 1995

[54] POROUS FILM AND POROUS FILM MANUFACTURING APPARATUS

[75] Inventors: Seiji Kagawa, 1-17-13-601 Honcho, Kawaguchi-shi, Saitama-ken; Yoichiro Kagawa, Kawaguchi, both of Japan

[73] Assignee: Seiji Kagawa, Japan

[21] Appl. No.: 261,375

[22] Filed: Jun. 16, 1994

Related U.S. Application Data

[62] Division of Ser. No. 958,729, Oct. 9, 1992, Pat. No. 5,352,108.

[30] Foreign Application Priority Data

Oct. 18, 1991 [JP] Japan .................. 3-297681
Mar. 31, 1992 [JP] Japan .................. 4-77322

[51] Int. Cl.$^6$ .............................. B29C 59/10
[52] U.S. Cl. .................... 118/620; 264/154; 264/162; 264/165; 264/449; 425/174.4; 425/174.6; 425/174.8 E; 425/DIG. 37
[58] Field of Search .......... 83/509.663; 264/22, 264/154, 162, 27, 165; 425/174.4, 174.6, 174.8 E, 290, 363, 367, 385, DIG. 26, DIG. 37, DIG. 235; 118/620

[56] References Cited

U.S. PATENT DOCUMENTS

| | | | |
|---|---|---|---|
| 2,385,246 | 5/1941 | Wilsey et al. | 175/265 |
| 2,388,069 | 7/1942 | Meaker et al. | 175/265 |
| 2,538,578 | 10/1946 | Meaken | 219/19 |
| 2,550,336 | 10/1946 | Meaken | 219/19 |
| 3,141,746 | 10/1960 | De Lai | 51/307 |
| 3,359,597 | 7/1966 | Bainton | 18/12 |
| 3,471,597 | 10/1969 | Schivinen | 264/25 |
| 3,529,045 | 5/1965 | Rosenstern | 264/40 |
| 3,718,059 | 12/1969 | Clayton | 83/2 |
| 3,777,164 | 12/1973 | Osman | 250/531 |
| 3,833,439 | 9/1974 | Smith | 156/219 |
| 4,057,377 | 11/1977 | Sakuvazawa | 425/135 |
| 4,268,338 | 5/1981 | Peterson | 156/251 |
| 4,323,409 | 4/1981 | Alt | 156/219 |
| 4,351,784 | 9/1982 | Thomas et al. | 264/22 |
| 4,396,925 | 8/1983 | Kohashi | 346/140 R |
| 4,423,191 | 12/1983 | Haven et al. | 525/169 |
| 4,512,941 | 4/1985 | von Seggeun et al. | 264/22 |
| 4,728,566 | 3/1988 | Lancaster et al. | 428/286 |
| 4,778,634 | 10/1988 | Douglas | 264/22 |
| 4,859,519 | 8/1989 | Cabe, Sr. et al | 428/131 |
| 4,906,172 | 3/1990 | Stewart | 425/174.4 |
| 4,978,055 | 12/1990 | Millen | 229/72 |
| 5,057,167 | 10/1991 | Genbeck | 156/62.2 |
| 5,061,337 | 10/1991 | Fraser | 156/351 |
| 5,194,190 | 3/1993 | Kim | 264/25 |
| 5,257,923 | 11/1993 | Kagawa | 425/290 |
| 5,296,170 | 3/1994 | Novitsugu et al. | 264/22 |
| 5,352,108 | 10/1994 | Kagawa et al. | 425/174.4 |

FOREIGN PATENT DOCUMENTS 06076918 7/1992 Japan .

Primary Examiner—W. Gary Jones
Assistant Examiner—Mark DeSimone
Attorney, Agent, or Firm—Kenyon & Kenyon

[57] ABSTRACT

This invention provides a porous film useful as a fresh fruit and vegetable wrapping material which is obtained by forming a large number of small recesses in an organic film and which does not allow permeation of water, bacteria, and viruses, but allows permeation of a gas, e.g., the oxygen gas or the carbon dioxide gas, and water vapor. The porous film includes the organic film and the large number of recesses formed in the organic film and having an average opening width of 0.5 $\mu$m to 300 $\mu$m and inner surfaces exhibiting affinity.

9 Claims, 11 Drawing Sheets

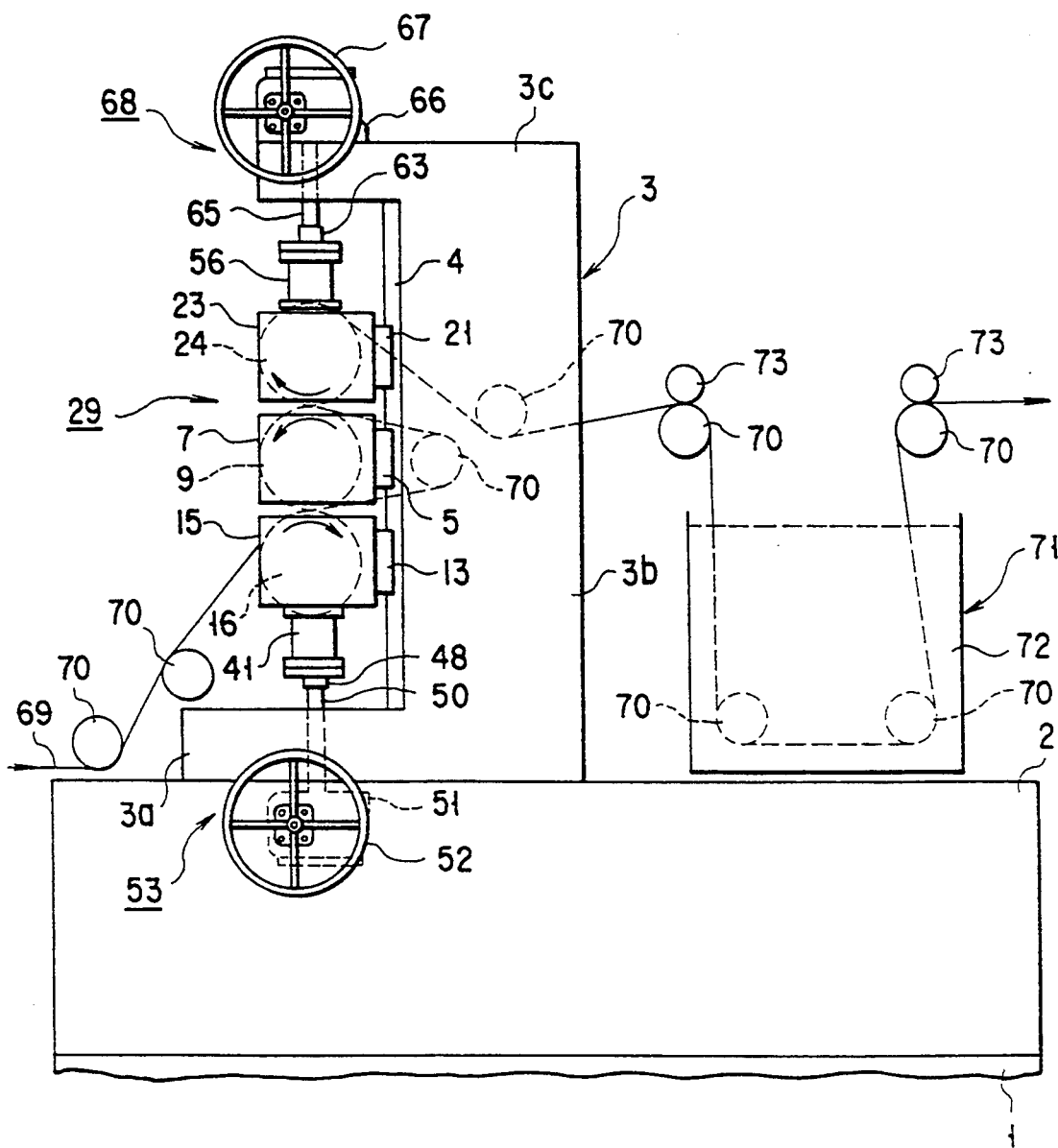
F I G. 1

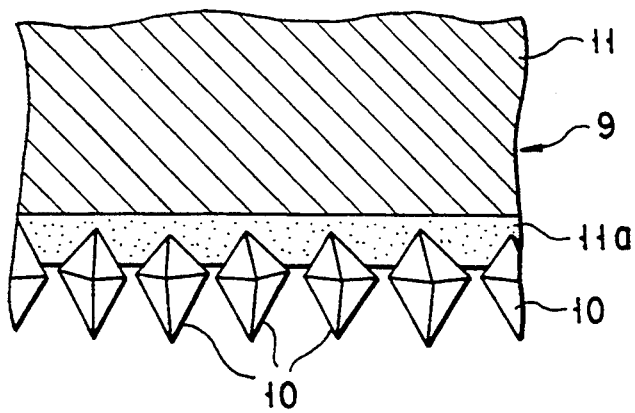
F I G. 4
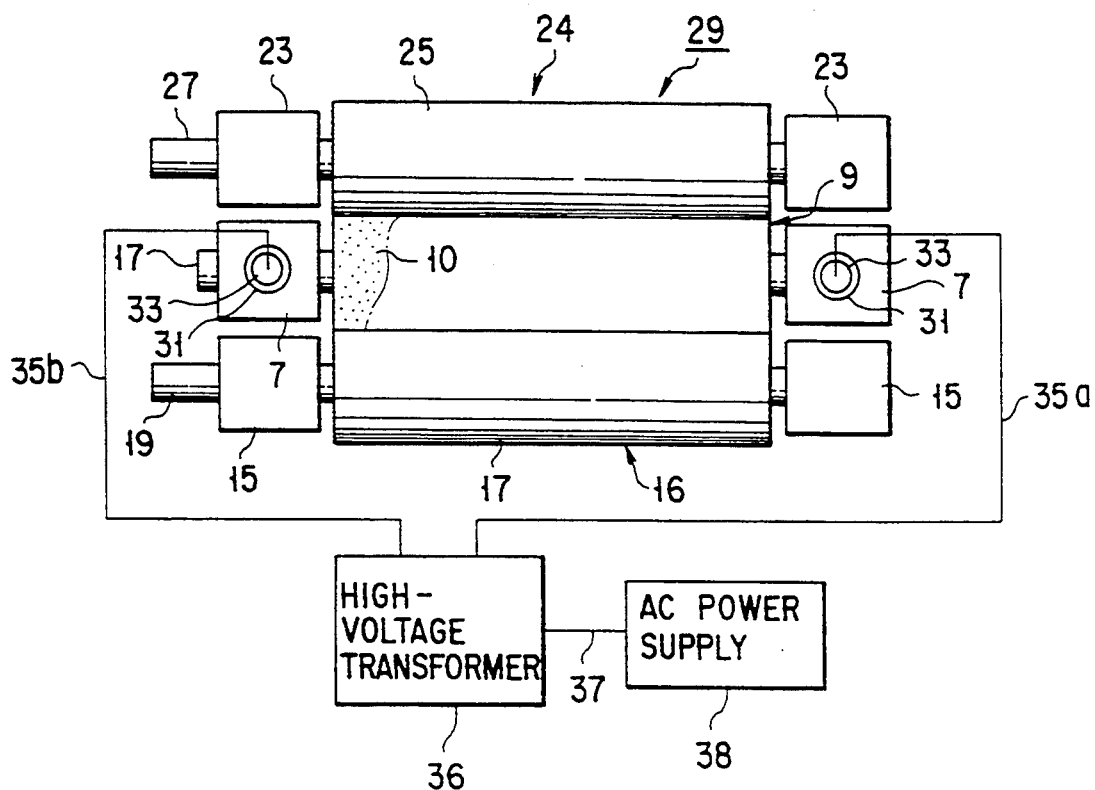
F I G. 5

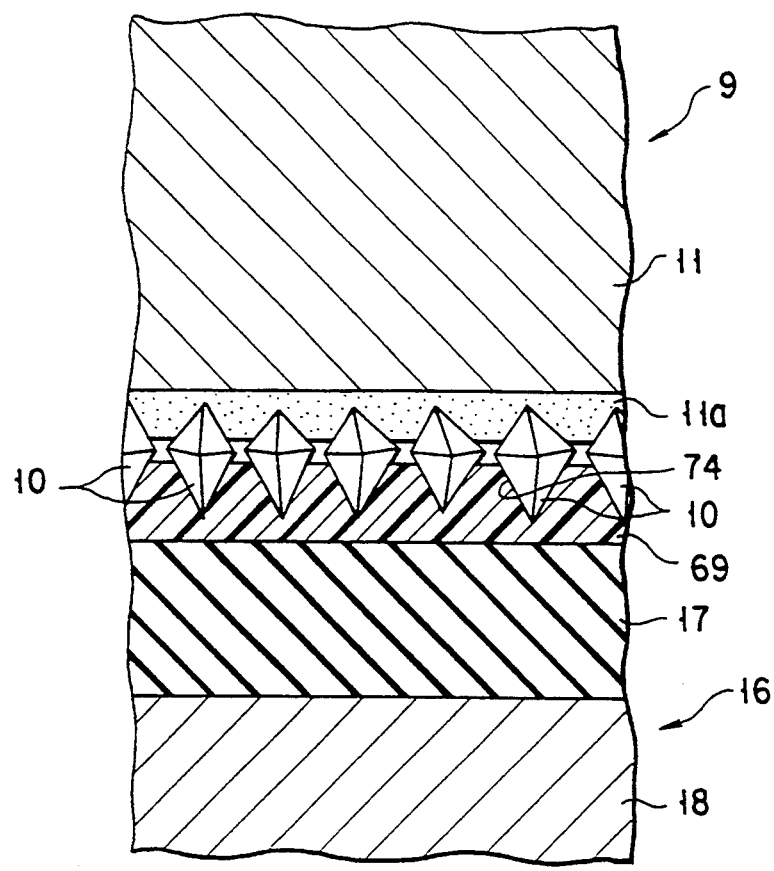
F I G. 6
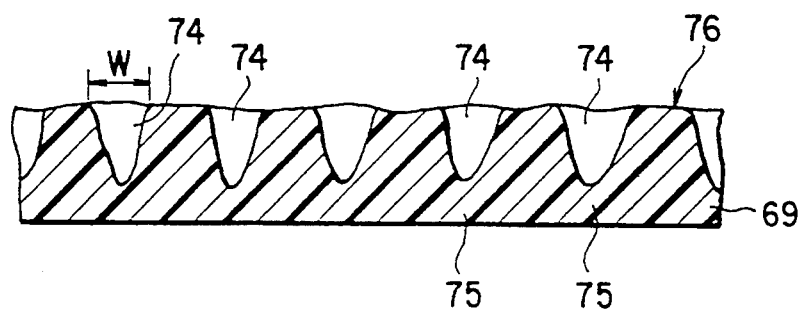
F I G. 7

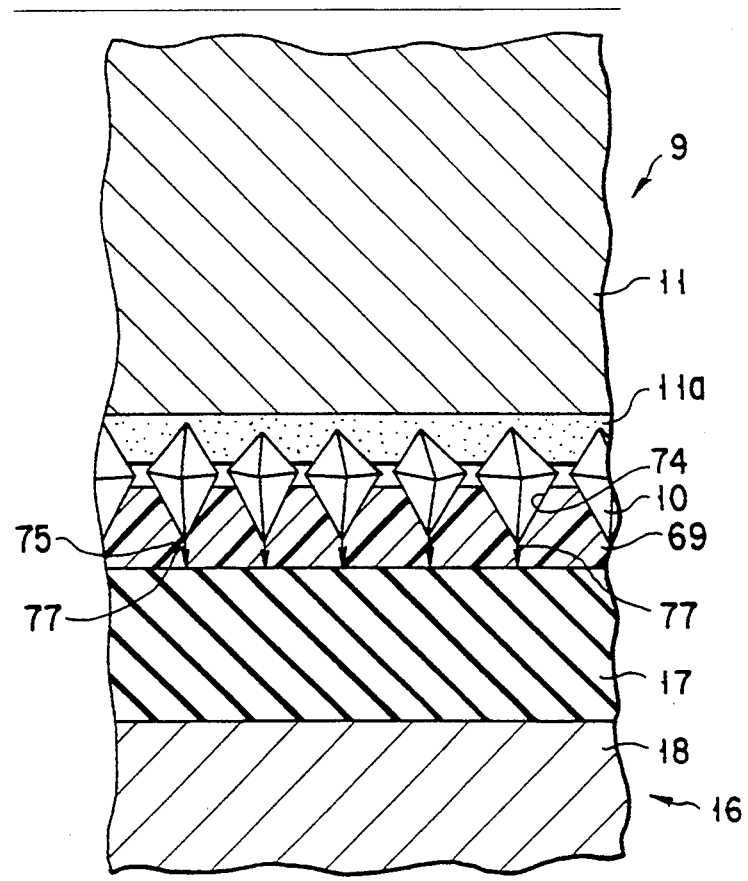
F I G. 8
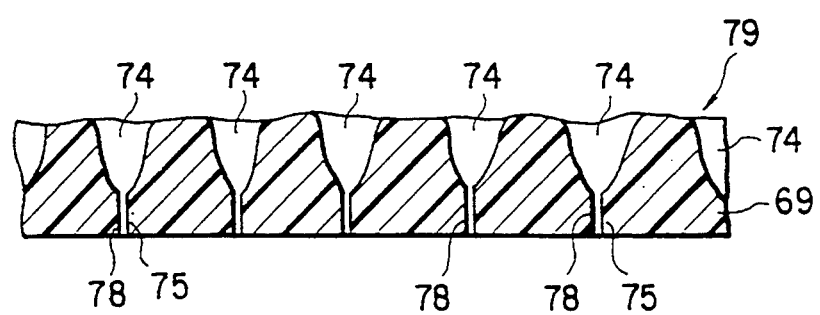
F I G. 9

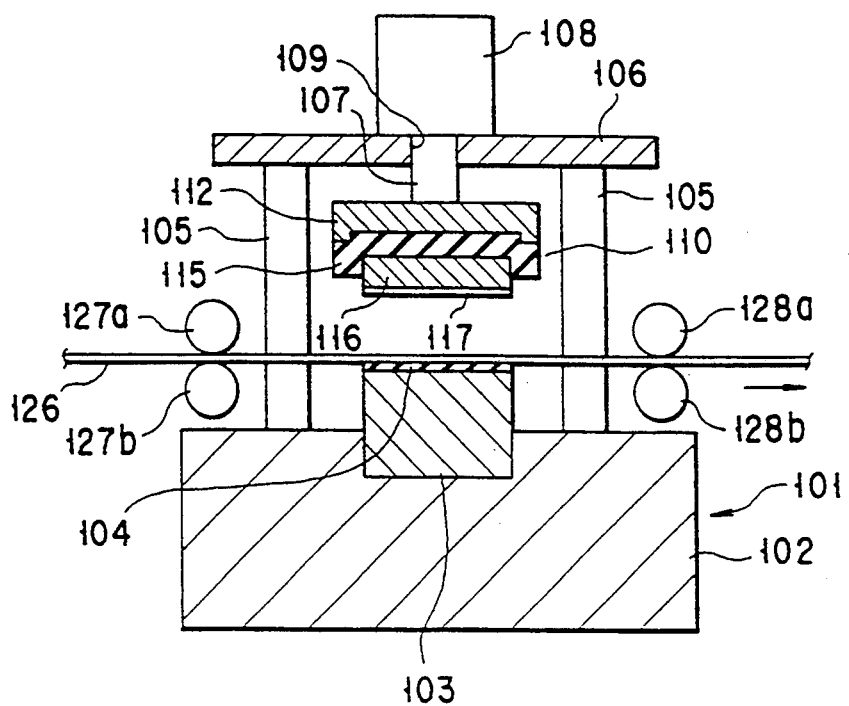
F I G. 10

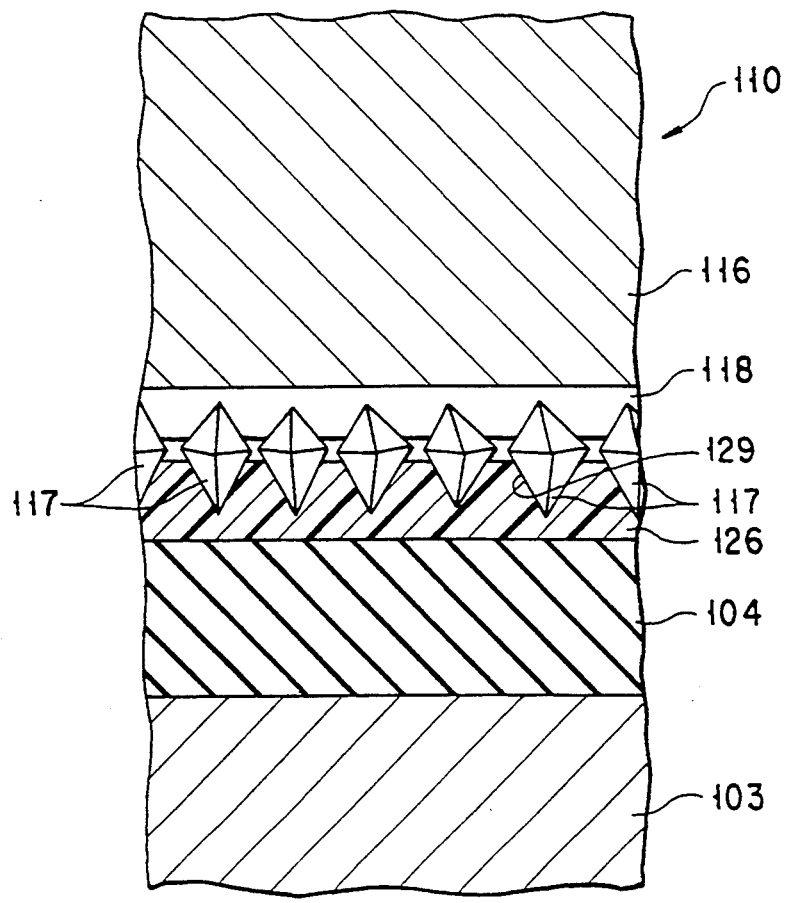
F I G. 15
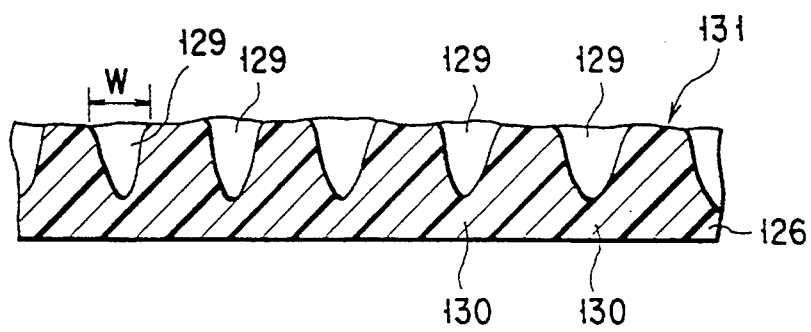
F I G. 16

POROUS FILM AND POROUS FILM MANUFACTURING APPARATUS

This is a divisional of application Ser. No. 07/958,729, filed Oct. 9, 1992, entitled POROUS FILM AND POROUS FILM MANUFACTURING APPARATUS, now U.S. Pat. No. 5,352,108.

BACKGROUND OF THE INVENTION

1. Field of the Invention

The present invention relates to a porous film and a porous film manufacturing apparatus and, more particularly, to a porous film suitable for a material such as a sanitary material, a medical material, a clothing material, or a wrapping material, and an apparatus for manufacturing the same.

2. Description of the Related Art

Conventionally, as a method of manufacturing a film of this type, a following method is known. In this method, a fine inorganic powder is filled in a general-purpose olefin resin (e.g., polyethylene) in a large amount (generally, 50 vol % or more of the resin) and is formed into a film. The film is then uniaxially or biaxially stretched at a high ratio to form open cells in the interface between the resin and the inorganic powder, thus forming fine pores which communicate with each other in the form of a maze.

In the conventional manufacturing method described above, however, the following problems are posed.

(1) Since a large amount of inorganic powder is added, the essential properties (e.g., strength, softness, and transparency) of a resin constituting a film are considerably deteriorated, and a plastic-like film cannot be substantially obtained.

(2) Since a large amount of inorganic powder is added, and the resultant film is uniaxially or biaxially stretched at a high magnification, this method cannot be applied to a film having elasticity, such as an elastomer film.

(3) since fine pores on the submicron order are formed in the resultant film so as to communicate with each other in the form of a maze, a film has low air permeability although it has vapor permeability. For this reason, practical applications of the film are undesirably limited.

As other porous film manufacturing methods, mechanical perforation methods such as a needle punch method and a heat fusion perforation method are known. In the needle punch method, a thermoplastic resin film is perforated by pressing heated needles against the film. In the heat fusion perforation method, a thermoplastic resin film is perforated by fusing the film by using a heated embossed roll.

A large number of through pores are formed in the porous thermoplastic resin film formed by a mechanical perforation method. For this reason, the size and number of through pores formed in the porous thermoplastic resin film are adjusted to control the gas permeation amount (e.g., the oxygen gas permeation amount). However, water, bacteria, and viruses also permeate through the through pores of the porous thermoplastic resin film. In addition, since the size of each through pore is as large as about 100 $\mu$m, it is difficult to highly accurately control the oxygen gas permeation amount.

U.S. Pat. No. 3,718,059 discloses a method of forming fine pores in a thermoplastic resin film comprising the steps of providing a pair of opposite rolls firmly engaged with each other, providing abrasive particles on a surface of one roll, passing the thermoplastic resin film through engagement of the pair of rolls, perforating the film with the abrasive particles by adjusting a pressure and temperature in the engagement of the rolls, forming fine through pores in the film at locations contacting the abrasive particles, and removing the film having the fine pores formed therein from the engagement of the rolls.

SUMMARY OF THE INVENTION

It is an object of the present invention to provide a porous film having an excellent adhesion strength with coating agents including an ink or various fine powders such as a magnetic powder.

It is another object of the present invention to provide a gas permeability control film in which water, bacteria, and viruses do not permeate, and the oxygen gas permeation amount and the carbon dioxide gas permeation amount can be controlled.

It is still another object of the present invention to provide a water vapor permeability control film in which water, bacteria, and viruses do not permeate, and the water vapor permeation amount can be controlled.

It is still another object of the present invention to provide a porous film manufacturing apparatus which can uniformly form a large number of (e.g., 500 to 200,000 per cm$^2$) recesses, each having a small opening width arbitrarily selected in the range of sub-$\mu$m to 300 $\mu$m and an inner surface exhibiting affinity, in an elongated organic film made of various types of materials, such as polymeric materials, with almost no deterioration in essential properties (e.g., transparency, strength, and softness) of the film materials.

It is still another object of the present invention to provide a porous film manufacturing apparatus which can uniformly form a large number of (e.g., 500 to 200,000 per cm$^2$) recesses, each having a small opening width arbitrarily selected in the range of sub-$\mu$m to 300 $\mu$m and an inner surface exhibiting affinity, in an elongated organic film, with almost no deterioration in essential properties (e.g., transparency, strength, and softness) of the film materials, and which can form through pores, each having an inner surface exhibiting affinity and a diameter smaller than the width of the opening, in the thin portions of the film which are located below recesses.

It is still another object of the present invention to provide a porous film manufacturing apparatus which can uniformly form a large number of recesses (or recesses and through pores communicating thereto) in an elongated organic film without making wrinkles on the film.

It is still another object of the present invention to provide a porous film manufacturing apparatus which can continuously, uniformly form a large number of recesses (or recesses and through pores communicating thereto) in an elongated organic film made of the materials enumerated above without making scratches on the film.

According to the present invention, there is provided a porous film comprising an organic film and a large number of recesses formed in the organic film and each having a small opening width and an inner surface exhibiting affinity.

Examples of the organic film are: a polyolefin film such as polyethylene film or polypropylene film; a polyester film such as polyethylene terephthalate film; various polymer resin films made of polyvinyl chloride, a fluoroplastic, polyamide, polycarbonate, polyimide, polyether ether ketone, polyether ketone, an elastomer, and polyurethane; various foamed polymer resin films made of foamed polyethylene and foamed polypropylene; foamed paper; a heat-fusible resin film; a multilayered film, i.e., a two- or three-layered film or heterogeneous polymer resin films, such as a two-layered film of a polyethylene terephthalate film and a polyethylene film, and a two-layered film of a polyethylene terephthalate film and a polypropylene film; and other multilayered films such as a multilayered film obtained by stacking woven or unwoven fabric on a polymer resin film, or a multilayered film obtained by stacking paper on a polymer resin film.

An organic film having a thickness of, e.g., 5 μm to 3 mm is used.

Each of the recesses formed in the organic film has an inverted conical shape, e.g., an inverted circular conical or pyramidal shape.

The average opening width of the recesses formed in the organic film is arbitrarily selected in the range of, e.g., 0.5 μm to 300 μm depending on the application purposes of the porous film. The large number of recesses preferably have a uniform opening width.

The number of recesses formed in the organic film is arbitrarily selected in the range of, e.g., 500 to 200,000 per $cm^2$ according to the opening width of the recesses and the application purposes of the porous film. The large number of recesses are preferably formed to be uniformly dispersed in the organic film.

The thickness of the thin portions of the film which are located below the recesses cannot be uniquely determined from the opening width of the recesses and the application purposes of the porous film. Usually, however, it is preferably set to 10 μm or less.

The porous film according to the present invention is designed to have an organic film and a large number of recesses (e.g., inverted conical recesses) formed in the organic film and each having a small opening width and an inner surface exhibiting affinity, and retains the essential properties (e.g., the transparency, softness, and strength) of the organic film.

Furthermore, since the porous film has a large number of recesses each having an inner surface exhibiting affinity, its wettability is greatly improved compared to an organic film having no recesses. Since the large number of fine recesses are formed in the porous film, when an adhesive is coated on the opening portions of the recesses, the porous film has an excellent anchoring effect for an adhesive layer. Such a porous film can be utilized as a coating film formation base film or a laminated film to be described later.

(1) A resin solution containing a magnetic powder is applied to the opening surfaces of the recesses of the porous film to enhance the wettability and anchoring effect of the large number of fine recesses of the porous film, thereby coating a magnetic layer having a high adhesion strength with the porous film. Hence, the porous film covered with the magnetic layer can be utilized as a magnetic film. In particular, since the magnetic powder can be embedded in the large number of recesses of the porous film, the filling density of the magnetic powder can be increased even if the thickness of the magnetic layer is small. As a result, a thin magnetic film, e.g., a prepaid card, capable of performing high-density recording can be obtained.

(2) An ink is applied to the opening surfaces of the large number of recesses of the porous film and is dried, thereby obtaining an ink layer having a high adhesion strength with the porous film due to the wattability and anchoring effect of the large number of fine recesses of the porous film. Hence, the porous film having this ink layer can be utilized as an ink ribbon. In particular, since the ink can be filled in the large number of recesses of the porous film, the coating amount of the ink can be increased even if the thickness of the ink layer is decreased. As a result, a thin ink ribbon capable of excellent recording can be obtained.

(3) When an organic film (first organic film) incompatible with a predetermined adhesive and an organic film (second organic film) compatible with the predetermined adhesive are to be laminated on each other by using the predetermined adhesive, a large number of fine recesses are formed in the first organic film to obtain a porous film. The predetermined adhesive is applied to the side of the porous film having the opening surfaces of the recesses, and the second organic film is adhered to this adhesive, thereby laminating the first and second organic films. In this laminated structure, the adhesive can be properly adhered to the porous film due to the wettability and anchoring effect of the large number of fine recesses. On the other hand, the second organic film is compatible with this adhesive. As a result, the first and second organic films can be firmly adhered through the adhesive to obtain a laminated film.

Since the porous film has many recesses, those portions located below the recesses are thinner than the other portions. The thin portions do not allow permeation of water, bacteria, and viruses, and more readily allows permeation of gases such as oxygen and carbon dioxide, water vapor. More specifically, the permeation amounts of oxygen gas and carbon dioxide gas are greatly increased by gas solubility and diffusion caused by the film element at the thin portions of the organic film. In addition, water vapor is deposited in the large number of fine recesses, each having an inner surface exhibiting affinity, and the water vapor of the film element is diffused in the thin portions of the organic film, thus greatly increasing the water vapor permeation amount. For this reason, when the opening width and the number of the recesses and the thickness of the thin portions of the organic film are controlled, a porous film in which the permeation amounts of oxygen gas and carbon dioxide gas and the vapor permeation amount are controlled can be obtained. The oxygen gas permeation amount of the porous film is, for example, $10^3$ to $10^7$ $cc/m^2 \cdot 24$ $hr \cdot 25°$ C. The porous film can be applied to the following wrapping material.

(1) For example, a porous film comprising an organic film such as a polyethylene film, a biaxially stretched polypropylene film, a polypropylene film, or a polyethylene terephthalate film in which a large number of recessed portions, each having an inner surface exhibiting affinity, are formed can be utilized as a fresh fruit and vegetable wrapping material.

More specifically, when a fresh fruit or vegetable is wrapped and sealed by a conventional wrapping material, the oxygen concentration in the wrapping material is decreased and the carbon dioxide gas concentration therein is increased due to a respiration effect of the fruit or vegetable itself. For this reason, the decrease in oxygen amount and the increase in carbon dioxide gas suppress respiration of the fruit or vegetable, thereby maintaining the fruit or vegetable fresh. In this case, the film serving as the element of the wrapping material must satisfy the following conditions. The wrapping material must allow permeation of a minimum amount of oxygen which allows normal respiration of the fruit or vegetable and maintenance of the life of the fruit or vegetable. At the same time, the concentration of carbon dioxide gas produced by respiration should not be excessive, and the film must allow permeation of water vapor so as not to cause moisture condensation leading to proliferation of bacteria.

When a large number of recesses, each having an inner surface exhibiting affinity, are formed in, e.g., a polypropylene film to fabricate the porous film described above, the permeation amounts of oxygen gas and carbon dioxide gas are greatly increased, and permeation of water and viruses can be prevented, as described above. Thus, oxygen gas can permeate the wrapping material made of the porous film, carbon dioxide gas produced by respiration of the fruit or vegetable can permeate the film to prevent an excessive concentration of carbon dioxide gas, and water vapor causing moisture condensation can permeate the porous film. As a result, the wrapping material made of the porous film has an excellent fresh fruit and vegetable maintenance effect.

(2) A porous film which comprises a laminated film of a first film, e.g., a polyethylene or polypropylene film and a second film, e.g., a polyethylene terephthalate film, and in which a large number of fine recesses, each having an inner surface exhibiting affinity, are formed from the second film side to the first film side, can be utilized as a low-cost deoxidant wrapping material. The recesses formed in the porous film are through pores in the second film.

More specifically, a conventional deoxidant wrapping material has a structure in which a large number of through pores are formed in a two-layered film consisting of a polyethylene terephthalate film and a polyethylene film in accordance with a needle punch method or the like, and Japanese paper is laminated on the polyethylene film side of the two-layered film. For this reason, the resultant wrapping material becomes expensive by an amount required for adhesion of the Japanese paper. When a deoxidant is stored in the wrapping material and the wrapping material is stored in a sealed container together with a liquid content, the content permeates inside the wrapping material through the through pores and the Japanese paper. As a result, the deoxidant stored in the wrapping material is undesirably deteriorated.

A deoxidant wrapping material is formed into a bag such that the first film of the porous film according to the present invention faces inside. In this wrapping material, external oxygen can permeate through the large number of through pores of the second film, and gas solubility and diffusion inside the wrapping material can be caused by the film element in the thin portions of the organic film which are located below the recesses of the first film.

When a deoxidant is stored in the above wrapping material and the wrapping material is stored in a sealed container having a good gas barrier property together with a content such as candies, oxygen in the container permeates through the wrapping material and is absorbed by the deoxidant. As a result, the atmosphere inside the container can be almost free from oxygen. Therefore, quality degradation of the content which is caused by oxidation can be prevented.

Since the wrapping material has a high resistance to water permeability, even a liquid content cannot permeate through the wrapping material, thereby preventing deterioration of the deoxidant inside the wrapping material. As a result, liquid and solid contents can be preserved for a long period of time by preparing only several types of wrapping materials.

(3) Since the porous film can control the permeation amounts of oxygen gas and carbon dioxide gas by controlling the width and number of recesses and the thickness of the thin portions of the organic film, this film can be used as an oxygen gas filter or a carbon dioxide gas filter.

(4) A porous film comprising an organic film such as an elastomer film in which a large number of fine recesses, each having an inner surface exhibiting affinity, are formed can be utilized for an expandable cataplasm base film.

The cataplasm is adhered to a skin to achieve an anti-inflammatory effect or a secretion absorption effect. A structure in which a paste-like medicine containing a powder medicine for external application is applied to cloth is known as the conventional cataplasm. In the cataplasm having the above structure, water vapor cannot sufficiently permeate through the cloth. For this reason, when the cataplasm is adhered to the skin before a patient goes to bed, sweat appearing on the skin does not permeate through the cataplasm and is left between the skin and the cataplasm to result in discomfort.

The cataplasm obtained by applying a medicine for external application to the porous film according to the present invention has high water vapor permeability. For this reason, the sweat appearing on the skin can permeate through the cataplasm and can be properly evaporated. This cataplasm can be comfortably used even during sleep.

(5) A porous film comprising the elastomer film described in (4) above in which a large number of fine recesses are formed can prevent permeation of water, bacteria and viruses, enhances permeation of water vapor, and has a high expendability. Therefore, the water vapor permeability control film can be utilized as gloves for surgical operations.

Furthermore, according to the present invention, there is provided a porous film comprising an organic film, a large number of recesses formed in the organic film and each having a small opening width and an inner surface exhibiting affinity, and through pores formed in thin portions of the film which are located below the recesses and each having a diameter smaller than that of the opening width and an inner surface exhibiting affinity.

An organic film similar to that described with reference to the porous film is used. Especially, a polyolefin film such as a polyethylene film or polypropylene film (including a biaxially oriented polypropylene film), a polyethylene terephthalate film, or a laminated film of a polyolefin film and a polyethylene terephthalate film is preferable.

An organic film having a thickness of, e.g., 1 $\mu$m to 10 mm is used.

Each of the recesses formed in the organic film has an inverted conical shape, e.g., an inverted circular conical or pyramidal shape.

The average opening width of the recesses formed in the organic film is arbitrarily selected in the range of, e.g., 5 $\mu$m to 300 $\mu$m according to the application of the porous film. The large number of recesses preferably have a uniform opening width.

The number of recesses formed in the organic film is arbitrarily selected in the range of, e.g., 500 to 200,000 per cm$^2$ from the opening width of the recesses and the application purposes of the porous film. The large number of recesses are preferably formed to be uniformly dispersed in the organic film.

The thickness of the thin portions of the film which are located below the recesses cannot be uniquely determined from the thickness of the organic film and the opening width of the recesses, and the application purposes of the porous film. Usually, however, it is preferably set in the range of 1 $\mu$m to 20 $\mu$m.

Each through pore has, e.g., a columnar shape. The average diameter of the through pores is arbitrarily selected in the range of, e.g., 0.05 $\mu$m to 20 $\mu$m from the opening width of the recesses and the application purposes of the porous film.

Such a porous film according to the present invention is designed to have an organic film, a large number of recesses formed in the organic film and each having a small opening width and an inner surface exhibiting affinity, and through pores formed in the thin portions of the film which are located below the recesses and each having a diameter smaller than the opening width and an inner surface exhibiting affinity, and retains the essential properties (e.g., the transparency, softness, and strength) of the organic film.

Since the porous film has the large number of recesses each having an inner surface exhibiting affinity, and the through pores communicating with the portions below the recesses, its wettability is greatly improved compared to an organic film having no recess. Since the large number of small recesses are formed in the porous film, when an adhesive layer or the like is formed on the opening portions of the large number of recesses, the porous film exhibits an excellent anchoring effect for the adhesive layer or the like. Such a porous film can be utilized as the coating film formation base film or laminated film described above.

In the porous film, permeation of water is suppressed or prevented by the through pores which are formed in the thin portions of the film which are located below the recesses and which have a diameter smaller than that of the recesses. Hence, the porous film has an excellent water pressure resistance, and can prevent permeation of bacteria and viruses and control the permeation amount of a gas, e.g., oxygen gas or carbon dioxide gas, and the water vapor permeation amount by the through pores. More specifically, since the gas, e.g., oxygen gas or carbon dioxide gas is diffused to a surface of the porous film opposite to the surface where the recesses are formed through the small recesses of the organic film and the through pores below the recesses, the gas permeability amount is greatly increased. Water vapor attaches to the large number of small recesses of the organic film each having an inner surface exhibiting affinity, and is diffused through the through pores formed below the recesses and having a diameter smaller than the opening width and an inner surface exhibiting affinity. As a result, the water vapor permeability can be remarkably increased compared to that in the porous film described above which has only the recesses.

Thus, the porous film of this type can be effectively utilized as various types of wrapping materials, e.g., a fresh fruit and vegetable wrapping material and a deoxidant wrapping material, an expandable base film for a cataplasm, gloves for surgical operations, and the like described above.

In particular, a polyethylene film, a biaxially stretched polypropylene film, a polypropylene film, or a polyethylene terephthalate film (PET film) used as the fresh fruit and vegetable wrapping material originally has a remarkably small water vapor permeation amount compared to that of an elastomer film and a polyurethane film. When such an organic film is formed, recesses are processed by corona discharge by the manufacturing apparatus of the present invention to form a large number of fine recesses and through pores communicating with the recesses, each exhibiting affinity with the film, a porous film having a greatly increased water vapor permeation amount can be manufactured, so that water vapor is deposited to the large number of fine recesses, each having an inner surface exhibiting affinity, of the organic film upon being brought into contact, and is diffused through the through pores formed in the thin portions of the organic film and each having an inner surface exhibiting affinity. For example, when recesses and through pores are formed in a biaxially stretched polypropylene film to provide a porous film, the resultant porous film has a water vapor permeation amount about 1,000 times that of a biaxially stretched polypropylene film having no recesses and through pores. As a result, the porous film can be effectively used as a fresh fruit and vegetable wrapping material capable of effectively preventing fogging and moisture condensation caused by water vapor.

Furthermore, in the porous film, when the opening width of the recesses, the number of the recesses, the thickness of the thin portions of the film which are located below recesses, and the diameter of the through pores (e.g., columnar through pores) formed in the thin portions of the film, especially the thickness of the thin portions of the film and the diameter of the through pores, are controlled, the mean free path of the gas permeating the through pores can be controlled. As a result, the porous film can be used as, e.g., an oxygen gas filter through which only the oxygen gas in air can permeate, or a carbon dioxide gas filter through which only the carbon dioxide gas in air can permeate.

According to the present invention, there is provided a porous film manufacturing apparatus comprising:

feed means for feeding an elongated organic film;

a recess-forming unit including a first rotatable roll having a surface on which a large number of dielectric particles, each having sharp pointed portions and a Mohs hardness value of not less than 5, are deposited, and a second roll which is rotatable in a direction reverse to a rotating direction of the first roll and having a surface on which a dielectric layer is formed, the first and second rolls being arranged to cause the elongated organic film to pass therebetween, and either one or both of the rolls being movable in a direction along which the first and second rolls are aligned;

pressure control means, arranged near two end portions of either one of the rolls of the perforating unit, for controlling a pressure applied from each of the rolls to the elongated organic film; and high-voltage supply means for supplying a high voltage to the first roll.

The elongated organic film uses material similar to the porous film described above.

The elongated organic film preferably has a thickness falling within the range of 1 μm to 10 mm.

The feed means for feeding the elongated organic film is, for example, a roll on which the elongated organic film is wound. Alternatively, the feed means can be an apparatus for forming a film by inflation method or casting method if the elongated organic film is made of single polymeric resin.

The first roll has a structure in which large number of dielectric particles, each having sharp pointed portions and a Mohs hardness value of 5 or more, are electrodeposited on the surface of a metal body or are bonded thereto with an organic or inorganic binder.

The metal roll body is made of, e.g., copper, a copper alloy, iron, or an iron alloy, or obtained by coating a nickel or chrome plating layer on the surface of one of these metal materials.

As the dielectric particles having a Mohs hardness value of 5 or more, for example, silicon carbide particles (dielectric constant 9.7), or natural or synthetic diamond particles (dielectric constant 5.7) may be used. Especially, natural or synthetic diamond particles are preferable as they can be available to have a suitable dielectric, a very large hardness value strength and a high breakdown field ($3.5 \times 10^6$ v/cm). It is preferable to electrodeposit the natural or synthetic diamond particles on the roll body. At this time, it is preferable to form the roll body from copper or a copper alloy having a high conductivity. In this manner, when the natural or synthetic diamond particles are electrodeposited on the roll body, they can be firmly deposited on the roll body, and the deposition rate of the large number of natural or synthetic diamond particles on the roll body can be improved.

As the dielectric particles, particles having an average particle diameter of 10 to 350 μm and a particle diameter variation of 5% or less are preferably used. In order to form a large number of recesses, e.g., 500 to 200,000 per $cm^2$, in the elongated organic film, the large number of particles are preferably deposited on the surface of the roll body at an area ratio of 70% or more.

The second roll has a metal roll body and a dielectric layer coated on the surface of the roll body.

The metal roll body is made of, e.g., iron, an iron alloy, copper, or a copper alloy, or obtained by coating a nickel or chrome plating layer on the surface of one of these metal materials.

The dielectric layer is made of a ceramic, e.g., silicone rubber, alumina, zirconia, mullite, and silicone nitride. The dielectric layer preferably has a thickness of about 2 to 5 mm. A dielectric layer made of a ceramic is especially preferable as it has good dielectric characteristics and a high strength. In order to apply the ceramic layer on the roll body, e.g., spray coating is employed. After the ceramic layer is applied on the roll body by spray coating, the surface of the ceramic layer is preferably smoothed by abrasion.

The recess-forming unit is preferably constituted by the first and second rolls, shafts respectively extending through the central portions of the rolls, and boxes incorporating bearings serving to axially support both end portions of the shafts.

The first and second rolls constituting the recess-forming unit may be horizontally or vertically arranged. In order to facilitate assembly of the apparatus, it is preferable that the first and second rolls are vertically arranged to oppose each other.

The pressure control means preferably includes compression members, e.g., springs, arranged in the boxes arranged in the vicinity of the two end portions of either of the first and second rolls, for biasing one roll toward the other. Especially, it is preferable that the first roll be stationary, the second roll be arranged to be movable with respect to the first roll, and the pressure control means be arranged in the boxes in the vicinity of the two end portions of the second roll to bias the second roll toward the first roll.

The recess-forming unit can have a third roll on a side of the first roll opposite to the second roll to be rotatable in a direction opposite to that of the first roll.

The third roll preferably has a structure in which a shaft extends through the central portion of the third roll, and boxes incorporating bearings for axially supporting this shaft are arranged in the vicinity of the two end portions of this shaft. It is preferable that a pressure control means separate from that described above be provided in the boxes in the vicinity of the two end portions of the shaft of the third roll to bias the third roll toward the first roll.

When the third roll is added to the recess-forming unit, it is preferable that the first roll be disposed between the first and third rolls to be movable within a desired distance range, that is, to be freely movable, so that either the second or third roll can be biased toward the first roll by the pressure control means. In this arrangement, the following two modes can be employed: (1) the elongated organic film is caused to pass between the third and first rolls as well so as to perform recess-forming and corona discharge not only between the first and second rolls but also between the first and third rolls; and (2) the third roll is used as a press roll toward the first roll.

When the mode (1) is employed, the third roll should have a structure similar to that of the second roll. When the mode (2) is employed, the third roll should be a metal roll having at least a surface made of an insulating material, e.g., a ceramic roll or a metal roll having a surface coated with a ceramic layer or a polymer resin layer having good dielectric characteristics.

The high-voltage supply means preferably has insulating material layers, coated on the outer circumferential surfaces of the bearings axially supporting the shaft of the first roll, for electrically insulating the shaft from the boxes, insulating cylindrical members inserted from the surfaces of the boxes to extend through the boxes and the insulating material layers, high-voltage supply terminals inserted in the insulating cylindrical members such that distal ends thereof contact the bearings, and a high-voltage supply source (e.g., an AC or DC power supply) connected to the supply terminals. Especially, it is preferable to additionally provide a control member for controlling the high voltage supplied to the first roll in the path connecting the high-voltage supply terminals and the high-voltage supply source. As the insulating materials used to form the insulating material layers and the insulating cylindrical members, for example, a polymeric or ceramic material may be used. Engineering plastics having good dielectric characteristics and a high strength, e.g., a polycarbonate resin, are preferable.

Two or three or more recess-forming units each having a pressure control means and a high-voltage supply means may be arranged in the conveying direction of the elongated organic film. If, for example, two units are to be arranged, a large number of dielectric particles, each having a Mohs hardness value of 5 or more, which are deposited on the first roll of the unit of the first row may have a particle diameter different from that of particles deposited on the first roll of the unit of the second row. In addition, if two units are to be arranged, after an elongated organic film is caused to pass between and have recesses formed by the rolls (e.g., first and second rolls) of the unit of the first row, the elongated organic film may be caused to pass between the rolls (e.g., first and second rolls) of the unit of the second row while the elongated organic film surface opposite to the recess-forming surface is in contact with the first roll (on which a large number of dielectric particles, each having a Mohs hardness value of 5 or more, are deposited), thereby recess-forming the upper and lower surfaces of the film.

A destaticizing means may be arranged at the outlet of the recess-forming unit. This destaticizing means is constituted by a vessel in which, for example, pure water is stored, and an ultrasonic wave generating member for applying ultrasonic waves to the pure water.

According to the present invention, a porous film manufacturing apparatus comprises: feed means for feeding an elongated organic film; a recess-forming unit including a first rotatable roll having a surface on which a large number of dielectric particles, each having sharp pointed portions and a Mohs hardness value of not less than 5, are deposited, and a second roll which is rotatable in a direction reverse to a rotating direction of the first roll and having a surface on which a dielectric layer is formed, the first and second rolls being arranged to cause the elongated organic film to pass therebetween, and either one or both of the rolls being movable in a direction along which the first and second rolls are aligned; pressure control means, arranged near two end portions of either one of the rolls of the recess-forming unit, for controlling a pressure applied from each of the rolls to the elongated organic film; and high-voltage supply means for supplying a high voltage to the first roll. Hence, with the single unit, the apparatus can continuously and uniformly form a large number of (e.g., 500 to 200,000 per cm$^2$) recesses, each having a small opening width arbitrarily selected in the range of sub-$\mu$m to 300 $\mu$m and an inner surface exhibiting affinity, in an elongated organic film made of various types of materials, such as a polymer resin, with almost no deterioration in essential properties (e.g., transparency, strength, and softness) of the film.

More specifically, the second roll having a surface covered with a dielectric layer to constitute the recess-forming unit can be processed with a precision of several $\mu$m to sub-$\mu$m by the current mechanical process techniques. However, the first roll constituting the unit and having a surface on which a large number of dielectric particles (e.g., synthetic diamond particles), each having a Mohs hardness value of 5 or more, has a surface precision of several tens $\mu$m at most even if it is finished by abrasion after the particles are deposited on the surface. If the recess-forming unit incorporating the first roll having such a surface precision and the second roll is used, and the elongated organic film is caused to pass between the rolls, it is difficult to apply a uniform pressure to the film, which is in contact with the rolls, along the direction of the width of the film. Therefore, if an elongated organic film is formed with recesses by the above-described unit, the following problems are posed.

(1) Since some portions of an elongated organic film do not receive a sufficiently high pressure because of the displacement of the first roll, it is difficult to form uniform recesses each having a predetermined depth.

(2) Owing to the displacement of the first roll, the first and second rolls are intermittently rotated and hence cannot be smoothly rotated. As a result, wrinkles are formed on the entire surface of the film.

(3) If the thickness of the film varies, it may be cut while it passes between the rolls. As a result, it is difficult to continuously form recesses in the elongated organic film.

From these reasons, according to the present invention, the apparatus has the recess-forming unit having the first roll having a surface on which a large number of dielectric particles (e.g., synthetic diamond particles), each having a Mohs hardness value of 5 or more, and the second roll rotatable in the reverse direction to that of the first roll and having a surface covered with a dielectric layer; and the pressure control means arranged near the two end portions of either one of the rolls. With this arrangement, even if the first roll having a surface precision of several tens $\mu$m is incorporated, a pressure acting on the elongated organic film passing between the first and second rolls rotated in the opposite directions can be controlled. That is, the pressure acting on the elongated organic film passing between the rolls can be made uniform along the direction of the width of the film. In addition, a dynamic external force, such as vibrations and shocks acting between the rolls upon passage of the film is absorbed and reduced, and the rolls can be smoothly and continuously rotated.

More specifically, the first and second rolls of the recess-forming unit which are pressure-controlled by the pressure control means described above are rotated, the elongated organic film is passed between the first and second rolls, and a high voltage is supplied from the high-voltage supply means to the first roll having a surface on which a large number of synthetic diamond particles are deposited. At this time, the first and second rolls are uniformly pressed along the direction of the length. Thus, when the elongated organic film passes between the rolls, the sharp pointed portions of the large number of synthetic diamond particles deposited on the surface of the first roll uniformly press into the film, thereby forming a large number of recesses, e.g., inverted conical recesses each having small opening width, without deteriorating the essential properties (e.g., transparency, strength, and softness) of the film. At the same time, since the first roll to which the high voltage is supplied opposes the second roll having a surface coated with the dielectric layer through the elongated organic film, a uniform corona discharge generates between the large number of synthetic diamond particles, each having a dielectric and the dielectric layer on the second roll. To control the corona discharge, when a relatively low voltage is supplied from the high-voltage supply means to the first roll, the elongated organic film pressed by the large number of synthetic diamond particles of the first roll is uniformly irradiated with relatively low energy coronas. Then, the inner surfaces of the large number of recesses formed in the elongated organic film are caused to have affinity. When a relatively high voltage is applied from the high-voltage supply means to the first roll, high-energy coronas are generated, concentrating at the sharp pointed portions of the synthetic diamond particles, thus achieving a so-called edge effect. Due to the edge effect, those portions of the elongated organic film which are located below the diamond particles are perforated, thereby forming columnar through pores communicating with the recesses that are formed in the elongated organic film. The columnar through pores have a diameter smaller than the opening width of the recesses. The inner surfaces of the large number of recesses and the inner surfaces of the through pores formed in the elongated organic film are processed by corona discharge to have affinity.

Since the force acting between the first and second rolls of the recess-forming unit is controlled by the pressure control means and wrinkles are prevented from being formed on the first roll, the first and second rolls can be smoothly rotated at a high speed. As a result, no wrinkles are formed on the elongated organic film, processing capability of recess-forming and corona discharge are greatly improved.

Even if the thickness of the elongated organic film varies, the elongated organic film is prevented from being cut during passing between the rolls because of the operations described above. Therefore, a large number of recesses can be continuously formed in the elongated organic film.

When the third roll is added to the recess-forming unit, the first to third rolls are movably arranged, and the second and third rolls opposite to each other through the first roll are urged toward the first roll by the pressure control means, deflection in the first roll in the direction of the length can be effectively prevented. As a result, processing capability of recess-forming and corona discharge are greatly improved.

With the manufacturing apparatus described above, a large number of (e.g., 500 to 200,000 per $cm^2$) recesses, each having a small opening width arbitrarily selected in the range of sub-$\mu m$ to 300 $\mu m$ and an inner surface exhibiting affinity, can be uniformly formed in an elongated organic film with almost no deterioration in essential properties (e.g., transparency, strength, and softness) of the film materials. Hence, a porous film having good wettability and in which water, bacteria, and viruses do not permeate but a gas such as the oxygen gas and the carbon dioxide gas and water vapor permeate, can be manufactured. The porous film of this type can be effectively utilized as a coating film formation base film, a laminated film, various types of wrapping materials, e.g., a fresh fruit and vegetable wrapping material and a deoxidant wrapping material, an expandable base film for a cataplasm, gloves for surgical operations, and the like described above.

According to the manufacturing apparatus described above, a large number of (e.g., 500 to 200,000 per $cm^2$) recesses, each having a small opening width arbitrarily selected in the range of sub-$\mu m$ to 300 $\mu m$ and an inner surface exhibiting affinity, can be uniformly formed in an elongated organic film, with almost no deterioration in essential properties (e.g., transparency, strength, and softness) of the film materials. Also, through pores, each having a diameter smaller than the opening width described above and an inner surface exhibiting affinity, can be formed in the thin portions of the organic film which are located below the recesses. Thus, a porous film having good wettability in which water, bacteria, and viruses are suppressed or prevented from permeating but a gas such as the oxygen gas and the carbon dioxide gas and water vapor permiate, can be manufactured. The porous film of this type can be effectively utilized as a coating film formation base film, a laminated film, various types of wrapping materials, e.g., a fresh fruit and vegetable wrapping material and a deoxidant wrapping material, an expandable base film for a cataplasm, gloves for surgical operations, and the like described above.

In the porous film manufacturing apparatus according to the present invention, the feed means can be an apparatus for forming a film by an inflation method or casting method, thus enabling the consistent manufacture of the porous film from the polymeric material, that is, in accordance with the in-line method.

In the porous film manufacturing apparatus according to the present invention, when the first roll has a roll body and a large number of natural or synthetic diamond particles, each having a suitable dielectric, high hardness, and a high strength, electrodeposited on the roll body, recess-forming and corona discharge to the elongated organic film described above can stably be performed over a long period of time. In addition, since the large number of natural or synthetic diamond particles can be firmly brought into tight contact with the roll body, a first roll having a high durability can be realized. In particular, when the roll body is made from copper or a copper alloy having a surface coated with an Ni plating layer and a high conductivity, the natural or synthetic diamond particles can be electrodeposited on the roll body further firmly, realizing a first roll having a remarkably excellent durability.

Furthermore, in the porous film manufacturing apparatus according to the present invention, when two or more recess-forming units each having a pressure control means and a high-voltage supply means are arranged in the conveying direction of the elongated organic film, a large number of recesses having different opening width can be uniformly formed in the elongated organic film by changing the particle diameters of the large number of dielectric particles deposited on the first roll of the unit of the first row and on the first roll of the unit of the second row each having a Mohs hardness value of 5 or more.

The porous film manufacturing apparatus according to the present invention forms recesses or the like in an elongated organic film made of various insulating materials by the recess-forming unit that functions mainly by friction and corona discharge inducing electrification. As a result, a large amount of static electricity is generated on the surface of the film upon recess-forming and corona discharge processing described above to attract ambient dust. When a destaticizing means is provided at the outlet of the recess-forming unit, the large amount of static electricity generated on the surface of the elongated organic film after recess-forming can be eliminated, thus easily removing dust attached to the surface of the film. Especially, by using the destaticizing means constituted by a vessel for storing pure water and an ultrasonic wave generating member for applying ultrasonic waves to the pure water, dust attached to the surface of the porous film can be removed very easily by washing.

According to the present invention, there is also provided a porous film manufacturing apparatus comprising:

feed means for feeding an organic film;

a base having a dielectric layer formed on an organic film receiving surface thereof at least the organic film receiving surface being made of a conductive material;

press means arranged to be movable to press the organic film together with the base and having an electrode body on which a large number of dielectric particles, each having sharp pointed portions and a Mohs hardness value of 5 or more, are formed on a surface thereof opposing the base;

driving means for moving the press means to the base, thereby pressing the organic film located between the base and the press means; and high-voltage supply means for supplying a high voltage to the electrode body of the press means.

As the organic film, in addition those described with reference to the porous film described above, synthetic leather, a laminated product of synthetic leather and non-woven fabric, and the like are used. The organic film may be an elongated film or may have a size of the final product.

As the organic film feed means, when the film is, e.g., an elongated organic film, a roll on which the film is wound can be used. When the elongated organic film is made of a single polymer resin, a film manufacturing device employing inflation or casting can be used as the feed means.

The base has, e.g, a bed, a rest buried in the bed, and a dielectric layer formed on the surface of the rest. The dielectric layer may be directly formed on the bed to form the base.

The bed and the rest are made of, e.g., iron, an ion alloy, or other metals.

The dielectric layer is made of a ceramic, e.g., silicone rubber, alumina, zirconia, mullite, and silicone nitride. The dielectric layer preferably has a thickness of about 2 to 5 mm. A dielectric layer made of a ceramic is especially preferable as it has good dielectric characteristics and a high strength. In order to apply the ceramic layer on the rest, e.g., spray coating is employed. After the ceramic layer is applied on the rest by spray coating, the surface of the ceramic layer is preferably smoothed by abrasion.

The press means has a body made of, e.g., a metal material, an insulating plate fixed on a surface of the body opposing the base, and the electrode body, fixed to the insulating plate, on which the large number of dielectric particles each having a Mohs hardness value of 5 or more are deposited on a surface thereof facing the bed.

The body is made of a metal material, e.g., copper or an iron alloy. A metal layer made of, e.g., Ni or Cr may be formed on the surface of the body by plating.

The insulating plate can use, e.g., a polymeric material, a ceramic, or the like. An engineering plastic, e.g., a polycarbonate resin, which has a high withstand voltage and a high strength, is particularly suitable.

The electrode body is made of a metal, e.g., copper, a copper alloy, iron, or an iron alloy, or by forming a nickel or chrome plating layer on the surface of a selected one of the metals enumerated above.

The electrode body can have a size of the final product (e.g., a wrapping material of a deoxidant).

The surface of the electrode body on which the large number of dielectric particles are deposited is flat. If the final product of the organic film has a curved surface, the surface of the electrode body can be set to form a curved surface to coincide with the film shape of the final product. When an electrode body having this shape is used, the rest of the base is set to have a curved shape to coincide with the curved surface of the electrode body.

As the dielectric particles to be deposited on the surface of the electrode body, for example, silicon carbide particles (dielectric constant 9.7), or natural or synthetic diamond particles (dielectric constant 5.7) may be used. Especially, natural or synthetic diamond particles are preferable as they can be available to have a suitable dielectric constant, a very large hardness value, strength, and uniform particle diameter. It is preferable to electrodeposit the natural or synthetic diamond particles on the electrode body. At this time, it is preferable to form the electrode body from copper or a copper alloy having a high conductivity. In this manner, when the natural or synthetic diamond particles are electrodeposited on the electrode body, they can be firmly deposited on the electrode body, and the deposition rate of the large number of diamond particles on the electrode body can be improved.

As the dielectric particles, particles having an average particle diameter of 10 to 350 $\mu$m and a particle diameter variation of 5% or less are preferably used. In order to form many recesses, e.g., 500 to 200,000 per $cm^2$, in the organic film and to perform corona discharge to the organic film, many particles are preferably deposited on the surface of the roll body at an area ratio of 70% or more.

The press means can have a body made of an insulating material and the electrode body having a surface facing the base where the large number of dielectric particles are deposited.

As the driving means, e.g., an air cylinder, a hydraulic cylinder, a cylinder using a servo motor as a driving source, and the like can be used. The press means is preferably moved by the driving means such that the sharp pointed portions of the large number of dielectric particles deposited on the surface of the electrode body oppose the surface of the dielectric layer of the base at a predetermined gap.

When the press means is constituted by the body made of the conductive material, the insulating plate, and the electrode body on which the large number of dielectric particles are deposited, as described above, the high-voltage supply means preferably has the following structure. That is, the high-voltage supply means preferably comprises an insulating cylindrical member inserted from a surface of the body opposite to the base to extend through the body and the insulating plate, a high-voltage supply terminal inserted in the insulating cylindrical member such that a distal end thereof contacts the electrode body, and a high-voltage supply source (e.g., an AC or DC power supply) connected to the supply terminal. In particular, it is preferable to provide a control member for controlling the high voltage to be supplied to the electrode body in a path connecting the high-voltage supply terminal and the high-voltage supply source. The insulating cylindrical member is made of, e.g., a polymeric or ceramic material. In particular, an engineering plastic, e.g, a polycarbonate resin, having a high strength is suitable.

According to the present invention, there is also provided another porous film manufacturing apparatus comprising: feed means for feeding an organic film; a base having a dielectric layer formed on an organic film receiving surface thereof at least the organic film receiving surface being made of a conductive material; press means arranged to be movable to press the organic film together with the base and having an electrode body on which a large number of dielectric particles (e.g., synthetic diamond particles), each having sharp pointed portions and a Mohs hardness value of 5 or more, are formed on a surface thereof opposing the base; driving means for moving the press means to the base, thereby pressing the organic film located between the base and the press means; and high-voltage supply means for supplying a high voltage to the electrode body of the press means. Hence, a large number of (e.g., 500 to 200,000 per cm$^2$) recesses, each having a small opening width arbitrarily selected in the range of sub-$\mu$m to 300 $\mu$m and an inner surface exhibiting affinity, can be uniformly formed in an elongated organic film made of various types of materials, such as polymeric materials, with almost no deterioration in essential properties (e.g., transparency, strength, and softness) of the film materials.

More specifically, when the press means is moved to the base having the surface coated with the dielectric layer by the driving means to press the organic film (e.g., an elongated organic film) fed to a portion between the electrode body of the press means and the dielectric layer of the base, the sharp pointed portions of the large number of synthetic diamond particles deposited on the surface of the electrode body opposing the base uniformly press into the film, thereby forming, e.g., a large number of inverted conical recesses each having a small opening width with almost no deterioration in essential properties of the film materials (e.g., transparency, strength, softness, and the like). At the same time, when a high voltage is supplied from the high-voltage supply means to the electrode body of the press means, since the electrode body opposes the base having the surface coated with the dielectric layer through the elongated organic film, corona discharge uniformly generates between the large number of synthetic diamond particles deposited on the electrode body and the dielectric layer of the base. During this corona discharge, when a relatively low high-voltage from the high-voltage supply means is supplied to the electrode body, the elongated organic film pressed by the large number of synthetic diamond particles of the electrode body is uniformly irradiated with the corona having a relatively low energy, and the inner surfaces of the large number of recesses formed in the elongated organic film are set to have affinity by the corona discharge.

Meanwhile, when a relatively high voltage is supplied from the high-voltage supply means to the electrode body, high-energy coronas are generated, concentrating at the sharp pointed portions of the synthetic diamond particles, thus achieving a so-called edge effect. Due to the edge effect, those portions of the elongated organic film which are located below the synthetic diamond particles are perforated, thereby forming columnar through pores communicating with the recesses that are formed in the elongated organic film. The columnar through pores have a diameter smaller than the opening width of the recesses. The inner surfaces of the large number of recesses and the inner surfaces of the through pores formed in the elongated organic film are caused to have affinity by corona discharge.

After the recess-forming operation and corona discharge operation are performed, the press means is moved by the driving means to be separated from the base, and the elongated organic film is moved for a distance corresponding to the width (a length of a side of the elongated film in the moving direction) of the press means. Then, similar recess-forming and corona discharge are performed.

According to the manufacturing apparatus described above, a large number of (e.g., 500 to 200,000 per cm$^2$) recesses, each having a small opening width arbitrarily selected in the range of sub-$\mu$m to 300 $\mu$m and an inner surface exhibiting affinity, can be uniformly formed in an organic film, with almost no deterioration in essential properties (e.g., transparency, strength, and softness) of the film materials. Hence, a porous film which has good wettability and prevents permeation of water, bacteria, and viruses, but allows permeation of a gas, e.g., the oxygen gas and the carbon dioxide gas, and water vapor. This porous organic film can be effectively utilized as a coating film formation base film, a laminated film, various types of wrapping materials, e.g., a fresh fruit and vegetable wrapping material and a deoxidant wrapping material, an expandable base film for a cataplasm, and gloves for surgical operations, which are described with reference to the porous film manufacturing apparatus comprising the recess-forming unit described above.

According to the manufacturing apparatus described above, a large number of (e.g., 500 to 200,000 per cm$^2$) recesses, each having a small opening width arbitrarily selected in the range of sub-$\mu$m to 300 $\mu$m and an inner surface exhibiting affinity, can be uniformly formed in an organic film, with almost no deterioration in essential properties (e.g., transparency, strength, and softness) of the film materials. Also, through pores, each having a diameter smaller than the opening width of the recesses described above and an inner surface exhibiting affinity, can be formed in the thin portions of the film which are located below the recesses. Thus, a porous film having good wettability in which water, bacteria, and viruses are suppressed or prevented from permeating but a gas such as the oxygen gas and the carbon dioxide gas and water vapor permiate, can be manufactured. The porous film of this type can be effectively utilized as a coating film formation base film, a laminated film, various types of wrapping materials, e.g., a fresh fruit and vegetable wrapping material and a deoxidant wrapping material, an expandable base film for a cataplasm, gloves for surgical operations, and the like described above.

In particular, when an organic film, e.g., a polyethylene film, a biaxially stretched polypropylene film, a polypropylene film, or a polyethylene terephthalate film (OPP film) used as the fresh fruit and vegetable wrapping material is formed with recesses and processed by corona discharge by the manufacturing apparatus of the present invention to form a large number of fine recesses and through pores communicating with the recesses, each exhibiting affinity with the film, water vapor is deposited in the large number of fine recessed portions, each having an inner surface exhibiting affinity, of the organic film upon being brought into contact, and is diffused through the through pores formed in the thin portions of the film and each having an inner surface exhibiting affinity, thus manufacturing a porous film having a greatly increased water vapor permeation amount. For example, when recesses and through pores are formed in a biaxially stretched polypropylene film to provide a porous film, the resultant porous film has a water vapor permeation amount about 1,000 times that of a biaxially stretched polypropylene film having no recesses and through pores. As a result, the porous film can be effectively used as a fresh fruit and vegetable wrapping material capable of effectively preventing fogging and moisture condensation caused by water vapor.

In the porous film manufacturing apparatus of the present invention, when a press means having an electrode body of a relatively small size identical to the size of the final product (e.g., a wrapping material for a deoxidant or drying agent) is used to perform the recess-forming operation and the corona discharge operation, the smoothness precision of the surface of the electrode body of the press means on which the large number of synthetic diamond particles are deposited can be improved. As a result, the distance (gap) between the dielectric layer of the base and the electrode body of the press means in the process of applying pressure to the organic film can be set at a remarkably high precision. Thus, the large number of recesses having uniform depths can be formed in the organic film at a high reproducibility, and the inner surfaces of the recesses can be set to have high affinity. When this recess-forming operation and corona discharge operation are therefore applied to the laminated film described in item (2), a porous laminated film having a very high quality and applicable to a wrapping material for a deoxidant and a drying agent can be obtained.

Furthermore, in the porous film manufacturing apparatus according to the present invention, when the press means has an electrode body on which a large number of natural or synthetic diamond particles having a high hardness and strength are electrodeposited, recess-forming and corona discharge can be stably performed for the organic film over a long period of time. In addition, since the large number of natural or synthetic diamond particles can be firmly deposited on the electrode body, a press means having a high durability can be obtained. In particular, when the electrode body is made of a copper member or a copper alloy member having a high conductivity on which an Ni plating layer is formed on its surface opposing the base, the natural or synthetic diamond particles can be electrodeposited on the electrode body more firmly, thus enabling a press means having a remarkably high durability.

Furthermore, in the porous film manufacturing apparatus according to the present invention, when an electrode body, which has a curved surface to coincide with an organic film (e.g., a semi-fabricated product of a shoe constituted by a laminated member of synthetic leather and non-woven fabric) whose surface on which the synthetic diamond particles are deposited has the size of the final product, is used as the press means, and the base has a shape to coincide with the curved surface of the electrode body of the press means, a porous film having a water vapor permeability and a size of the final product can be manufactured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a front view showing a porous film manufacturing apparatus used in Examples 1 to 7 of the present invention;

FIG. 4 is an enlarged sectional view of the main part of a first roll of the manufacturing apparatus shown in FIG. 1;

FIG. 5 is a schematic diagram for explaining a high-voltage supply mechanism for supplying a high voltage to the first roll of the manufacturing apparatus shown in FIG. 1;

FIG. 6 is an enlarged sectional view of the main part of an elongated organic film for explaining recess-forming and corona discharge process in Example 1;

FIG. 7 is an enlarged sectional view of the main part of an elongated porous organic film manufactured in Example 1;

FIG. 8 is an enlarged sectional view of the main part of an elongated organic film for explaining recess-forming and another corona discharge process in Example 4;

FIG. 9 is an enlarged sectional view of the main part of an elongated porous organic film manufactured in Example 4;

FIG. 10 is a schematic sectional view showing a porous film manufacturing apparatus used in Examples 8 and 9 of the present invention;

FIG. 15 is an enlarged sectional view of the main part of an elongated organic film for explaining recess-forming and corona discharge process in Example 8;

FIG. 16 is an enlarged sectional view of the main part of an elongated porous organic film manufactured in Example 8;

DETAILED DESCRIPTION OF THE PREFERRED EMBODIMENTS

The preferred embodiments of the present invention will be described in detail.

Figure 2:
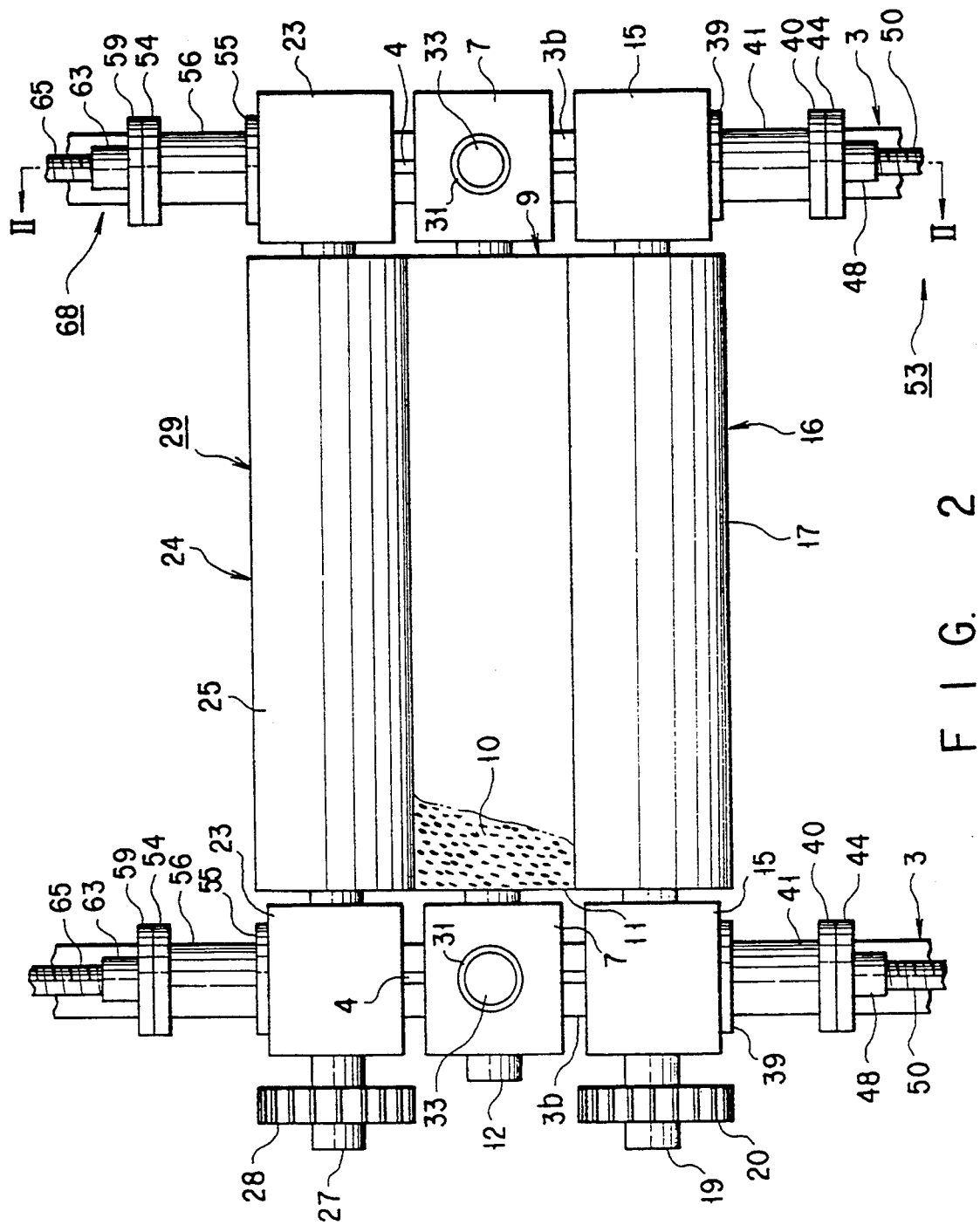
FIG. 2 is a side view showing the main part of the manufacturing apparatus shown in FIG. 1.
Figure 3:
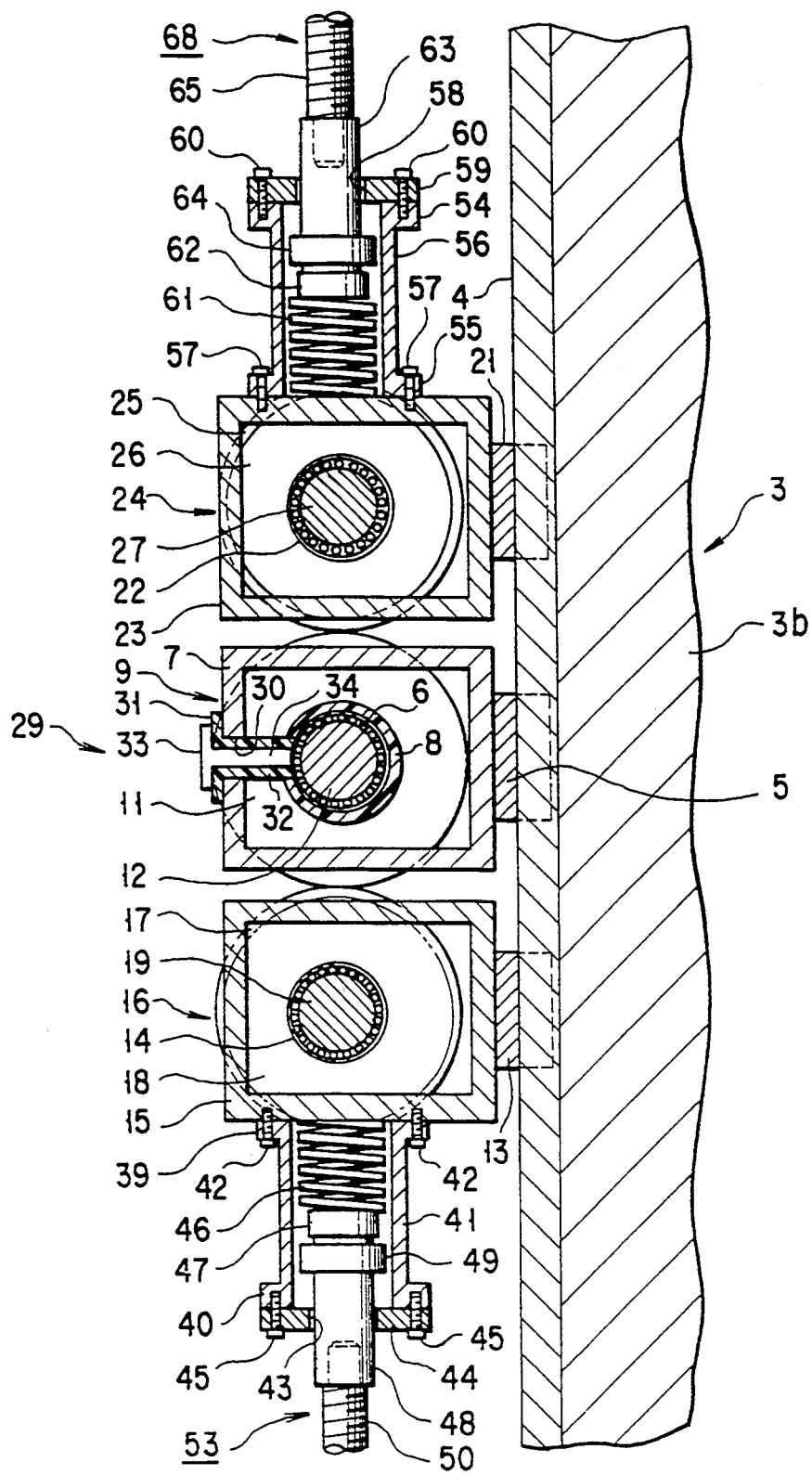
FIG. 3 is a sectional view of the main part along the line III—III in FIG. 2.

FIG. 1 is a front view showing a porous film manufacturing apparatus used in Examples 1 to 7 of the present invention, FIG. 2 is a side view showing the main part of the manufacturing apparatus shown in FIG. 1, FIG. 3 is a sectional view of the main part along the line III—III in FIG. 2, FIG. 4 is an enlarged sectional view of the main part of a first roll of the manufacturing apparatus shown in FIG. 1, and FIG. 5 is a schematic diagram for explaining a high-voltage supply mechanism for supplying a high voltage to the first roll of the manufacturing apparatus shown in FIG. 1.

Referring to FIGS. 1 to 5, reference numeral 1 denotes a bed. A table 2 is arranged on the upper surface of the bed 1 except for a portion near its right end. Two U-shaped frames 3 are arranged on the table 2 to be spaced apart by a predetermined distance in the direction of width of the table 2. Each frame 3 is constituted by a lower plate 3a, a side plate 3b, and an upper plate 3c. Rails 4 are respectively formed on the side plates 3b of the frames 3. As shown in FIG. 3, first sliders 5 (only one slider is shown) are respectively arranged on the rails 4 to be vertically movable. First boxes 7, each incorporating a bearing 6, are respectively fixed to the sliders 5 so as to be vertically movable along the rails 4. Insulating annular members 8 (only one insulating annular member is shown), each made of, e.g., a polycarbonate resin, for insulating the bearings 6 from the first boxes 7, are fitted on the respective bearings 6. A first roll 9 is arranged between the frames 3. As shown in FIGS. 2 and 4, the first roll 9 consists of a copper roll body 11 and a shaft 12. The roll body 11 is designed such that a large number of dielectric particles (e.g., synthetic diamond particles) 10, each having a particle diameter of 50 to 60 $\mu$m, sharp pointed portions, and a Mohs hardness value of 5 or more, are deposited on the surface of the main body at an area ratio of 70% or more through an Ni electrodeposition layer 11a. The shaft 12 extends through the center of the main body 11 to protrude from two end faces of the main body 11. The two protruding end portions of the shaft 12 are axially supported by the bearings 6 in the first boxes 7, respectively. Accordingly, the first roll 9 is arranged to be vertically slidable along the rails 4 by the first boxes 7 and the first sliders 5. Two stoppers (not shown) are provided at portions of each rail 4 corresponding to the first slider 5, so that the vertical movement of each first slider 5 is regulated within a range of, e.g., 5 mm by the two stoppers.

Second sliders 13 (only one slider is shown) are arranged on portions of the rails 4 of the respective side plates 3b located below the first boxes 7 to be vertically movable, as shown in FIG. 3. Second boxes 15, each incorporating a bearing 14, are fixed to the sliders 13 so as to be vertically movable along the rails 4. A second roll 16 is arranged between the frames 3 below the first roll to oppose it. The second roll 16 is constituted by an iron roll body 18 and a shaft 19 extending through the center of the roll body 18 to protrude from the two end faces of the main body 18, as shown in FIGS. 3 and 4. The roll body 18 has a surface covered with a dielectric layer 17 having a thickness of about 3 mm made of alumina. The dielectric layer 17 is formed by spraying alumina on the surface of the roll body 18 and abrading the surface of the sprayed alumina layer. The two protruding end portions of the shaft 19 are axially supported by the bearings 14 in the second boxes 15, respectively. Accordingly, the second roll 16 can be vertically moved by the second boxes 15 and the second sliders 13 along the rails 4. A portion of the shaft 19 on one end side (e.g., the left end side) of the second roll 16 extends through the second box 15, while the protruding portion of the shaft 19 is fitted in a gear 20 which is meshed with a gear (not shown) of a driving shaft of a motor (not shown).

As shown in FIG. 3, third sliders 21 (only one slider is shown) are respectively arranged on portions of the rails 4 of the side plates 3a located above the first boxes 7 to be vertically movable. Third boxes 23, each incorporating a bearing 22, are respectively fixed to the sliders 21 so as to be vertically movable along the rails 4. A third roll 24 is arranged between the frames 3 to be located above the first roll 6 so as to oppose the first roll 6. The third roll 24 is constituted by an iron roll body 26 covered with a dielectric layer 25 made of, e.g., alumina and having a thickness of about 3 mm and a shaft 27 extending through the central portion of the main body 26 to protrude from the two end faces of the main body 26, as shown in FIG. 3. The two protruding end portions of the shaft 27 are axially supported by the bearings 22 in the third boxes 23, respectively. Accordingly, the third roll 24 can be vertically moved by the third boxes 23 and the third slider 21 along the rails 4. A portion of the shaft 27 on one end side (e.g., the left end side) of the third roll 24 extends through the third box 23, while the protruding portion of the shaft 27 is fitted in a gear 28 which is meshed with the gear (not shown) of the driving shaft of the motor described above. While the second roll 16 is biased toward the first roll 9 by a first pressure control mechanism to be described later and the third roll 24 is biased toward the first roll 9 by a second pressure control mechanism to be described later, when the shaft 9 of the second roll 16 and the shaft 26 of the third roll 24 are rotated clockwise by the motor, the first roll 9 arranged between the second and third rolls 16 and 24 to be vertically movable is rotated counterclockwise.

A recess-forming unit 29 comprises the two frames 3, the two first boxes 7, the first roll 9, the two second boxes 15, the second roll 16, the two third boxes 23, and the sliders 5, 13, and 21.

Screw holes 30 are formed in the front wall portions of the first boxes 7, as shown in FIG. 3. An insulating cylindrical member 32 having a flange portion 31 to be brought into contact with the front surface of the corresponding box 7 and made of, e.g., a polycarbonate resin, is threadably inserted in each screw hole 30. The distal end of each insulating cylindrical member 32 reaches the outer circumferential surface of the bearing 6 through the insulating annular member 8 on the bearing 6 incorporated in the corresponding first box 7. A high-voltage supply terminal 34 having a flange portion 33 to be brought into contact with the flange portion 31 is inserted in each insulating cylindrical member 32. The distal end of each terminal 34 is connected to the corresponding bearing 6. The flange portions 33 of the terminals 34 are connected to a high-voltage transformer 36 serving as a high-voltage control member through cables 35a and 35b, as shown in FIG. 5. The high-voltage transformer 36 is connected to, e.g., an AC power supply 38 through a cable 37. The insulating annular members 8, the insulating cylindrical members 32, the high-voltage supply terminals 34, the high-voltage transformer 36, the AC power supply 38, and the like constitute a high-voltage supply mechanism as a high-voltage supply means. When an AC voltage is supplied from the AC power supply 38 to the high-voltage transformer 36 to control a voltage to a desired high voltage, and the high voltage is supplied to the terminals 34 through the cables 35a and 35b, since the terminals 34 are insulated from the first boxes 7 by the insulating cylindrical members 32 and the distal ends of the terminals 34 contact the bearings 6, the high voltage can be supplied to only the first roll 9.

Cylindrical members 41, each having upper and lower flanges 39 and 40, are respectively arranged on the lower walls of the two second boxes 15. Each cylindrical member 41 is fastened to a corresponding one of the second boxes 15 with a plurality of screws 42 threadably engaged with the lower wall of the second box 15 through the upper flange 39. A disk 44 having a hole 43 in center is mounted on the lower flange 40 of each cylindrical member 41. Each disk 44 is fixed to a corresponding one of the lower flanges 40 with a plurality of screws 45 threadably engaged with the lower flange 40 through the disk 44. A coil spring 46 is housed in each cylindrical member 41 to vertically apply an elastic force. A rod 48 having a pressure sensor 47 attached to its upper end is inserted in each cylindrical member 41 through the hole 43 in the disk 44. The pressure sensors 47 are respectively brought into contact with the lower ends of the coil springs 46 to detect pressures acting on the coil springs 46 upon upward movement of the rods 48. A disk-like guide 49 is attached to a portion of each rod 48 below a corresponding one of the sensors 47 so as to allow smooth vertical movement of the rod 48. A ball screw 50 is threadably inserted in the lower end portion of each rod 44. Each ball screw 50 extends through the lower plate 3a of the frame 3 to protrude into a recessed portion (not shown) of the table 2. Casings (only one casing is shown) 51, each incorporating a threaded engaging plate (not shown), are respectively arranged in the recessed portions. The protruding lower end portions of the ball screws 50 are threadably engaged with the engaging plates in the casings 51, respectively. A worm shaft (not shown) engaging with the protruding lower end portions of the ball screws 50 is horizontally inserted in the casings 51, while a handle (the other handle is not shown) 52 is arranged on one end of each worm shaft. With this arrangement, when the handle 52 is rotated, the ball screw 50 engaged with the worm shaft of the handle 52 is rotated to raise (or lower) the rod 48 in which the ball screw 50 is inserted. In this case, when the rod 48 is moved downward by a predetermined distance or more, the disk-like guide 49 attached to the rod 48 is brought into contact with the inner surface of the disk 44 on the lower portion of the cylindrical member 41, thus lowering the cylindrical member 41 itself. As a result, the second boxes 15 fixed to the upper ends of the cylindrical members 41 are respectively moved downward along the rails 4 through the sliders 13.

A first pressure control mechanism 53 for controlling the pressure acting on a film passing between the first and second rolls 9 and 16 is constituted by the two cylindrical members 41, the two disks 44, the two coil springs 46, the two pressure sensors 47, the two rods 48, the two disk-like guides 49, the two ball screws 50, the two casings 51, the two worm shafts (not shown), and the two handles 52.

Cylindrical members 56, each having upper and lower flanges 54 and 55, are respectively arranged on the upper walls of the two third boxes 23. As shown in FIG. 3, each cylindrical member 56 is fixed to a corresponding one of the third boxes 23 with a plurality of screws 57 threadably engaged with the upper wall of the third box 23 from the lower flange 51. A disk 59 having a hole 58 in its center is mounted on the upper flange 54 of each cylindrical member 56. Each disk 59 is fixed to a corresponding one of the upper flange 54 with a plurality of screws 60 threadably engaged with the upper flange 54 from the disk 59. A coil spring 61 is housed in each cylindrical member 56 to vertically apply an elastic force. The lower end of each coil spring 61 is in contact with the upper wall of the corresponding third box 23. A rod 63 having a pressure sensor 62 attached to its lower end is inserted into each cylindrical member 56 through the hole 58 in the disk 59. The pressure sensors 62 are respectively brought into contact with the upper ends of the coil springs 61 to detect pressures acting on the coil springs 61 upon downward movement of the rods 63. A disk-like guide 64 is attached to a portion of each rod 63 above a corresponding one of the sensors 62 so as to allow smooth vertical movement of the rod 63. A ball screw 65 is inserted in the upper end portion of each rod 63. Each ball screw 65 extends through the upper plate 3c of the frame 3 to protrude above the upper plate 3c. Casings (only one casing is shown) 66, each incorporating a threaded engaging plate (not shown), are respectively arranged on the upper surfaces of the upper plates 3c of the frames 3. The protruding upper end portions of the ball screws 65 are threadably engaged with the engaging plates in the casings 66, respectively. A worm shaft (not shown) engaging with the protruding upper end portion of the ball screw 65 is horizontally inserted in each casing 66, while a handle (the other handle is not shown) 67 is arranged on one end of each worm shaft. With this arrangement, when the handle 67 is rotated, the ball screw 65 engaged with the worm shaft of the handle 167 is rotated to lower (or raise) the rod 63 in which the ball screw 65 is inserted. In this case, when the rod 63 is moved upward by a predetermined distance or more, the disk-like guide 64 attached to the rod 63 is brought into contact with the inner surface of the disk 59 on the upper portion of the cylindrical member 56, thus raising the cylindrical member 56 itself. As a result, the third boxes 23 fixed to the lower ends of the cylindrical members 56 are respectively moved upward along the rails 4 through the sliders 21.

A second pressure control mechanism 68 for controlling the pressure acting on a film passing between the first and third rolls 9 and 24 is constituted by the two cylindrical members 56, the two disks 59, the two coil springs 61, the two pressure sensors 62, the two rods 63, the two disk-like guides 64, the two ball screws 65, the two casings 66, the two worm shafts (not shown), and the two handles 67.

A winding roll (not shown) for an elongated organic film is arranged in front of the recess-forming unit 29. An elongated organic film 69 is fed from the winding roll to a position between the first and second rolls 9 and 16 and a position between the first and third rolls 9 and 24 of the unit 29 through two feed rolls 70. A destaticizing mechanism 71 is arranged at the outlet of the unit 29. The destaticizing mechanism 71 is constituted by a vessel 72, arranged on the table 2, in which pure water is stored, and an ultrasonic wave generating member (not shown) for applying ultrasonic waves on the pure water. Five feed rolls 70 for conveying the elongated organic film 69 passing between the first and third rolls 9 and 24 are arranged between the unit 29 and the destaticizing mechanism 71, in the vessel 72, and at the outlet of the vessel 72, respectively. Note that abutment rolls 73 are respectively arranged in contact with the two feed rolls 70 located at the inlet and outlet of the vessel 72. A plurality of hot air blasting members (not shown) and a take-up roll (not shown) are sequentially arranged at the outlet of the destaticizing mechanism 71. The hot air blasting members serve to dry the film 69 passing between the feed roll 70 and the abutment roll 73.

EXAMPLE 1

A method of manufacturing a porous OPP film by performing recess-forming and corona discharge on elongated film consisting of 20 μm thick biaxially stretched polypropylene (OPP) between the first and second rolls 9 and 16 of the recess-forming unit 129 in the porous film manufacturing apparatus having the arrangement described above will be described with reference to FIGS. 1 to 7.

When the handles 52 and 67 of the first and second pressure control mechanisms 53 and 68 are rotated, the second and third rolls 16 and 24 are separated from the first roll 9, whose downward movement is regulated by the stoppers (not shown) by sufficient distances. The elongated organic film 69 made of OPP is fed from the winding roll (not shown) and is conveyed between the first and second rolls 9 and 16 of the recess-forming unit 29 by the two feed rolls, and through the two feed rolls 70. Thereafter, the film 69 is conveyed by the five feed rolls 70 to pass through the vessel 72 of the destaticizing mechanism 71. The film 69 is further conveyed to pass through the plurality of hot air blasting members (not shown), and the leading end of the elongated organic film 69 is wound around the take-up roll (not shown).

After the leading end of the elongated organic film 69 is wound around the take-up roll, the two handles 52 of the first pressure control mechanism 53 are rotated clockwise to move the second boxes 15 connected to the lower ends of the cylindrical members 41 upward by the sliders 13 along the rails 4 of the frames 3. The second roll 16 having the shaft 19 axially supported by the bearings 14 of the second boxes 15 is brought into contact with the first roll 9 located above the second roll 16 through the elongated organic film 69. In addition, the handles 52 are rotated in the same direction as described above to cause the sensors 47 at the upper ends of the rods 48 to compress the coil springs 46, respectively. Upon compression of the coil springs 46, forces are applied to the lower walls of the second boxes 15. The force acting between the second roll 16 having the shaft 19 axially supported by the bearings 14 in the second boxes 15 and the first roll 9 is increased. In this case, the force (compression force) acting between the second and first rolls 16 and 9 is detected by each pressure sensor 47. Clockwise or counterclockwise rotation of each handle 51 is controlled to control the force acting on the elongated film 69 located between the second and first rolls 16 and 9.

Subsequently, the two handles 67 of the second pressure control mechanism 68 are rotated counterclockwise to move the third boxes 23 connected to the lower ends of the cylindrical members 56 downward by the sliders 21 along the rails 4 of the frames 3. The third roll 24 having the shaft 27 axially supported by the bearings 22 of the third boxes 23 is brought into contact with the first roll 9 located below the third roll 24 through the elongated organic film 69. In addition, the handles 67 are rotated in the same direction as described above to cause the sensors 62 at the lower ends of the rods 63 to compress the coil springs 61, respectively. Upon compression of the coil springs 61, forces are applied to the upper walls of the third boxes 23. The force acting between the third roll 24 having the shaft 27 axially supported by the bearings 22 in the third boxes 23 and the first roll 9 is increased. In this case, the force (compression force) acting between the third roll 24 and the first roll 9 is detected by each pressure sensor 62. Clockwise or counterclockwise rotation of each handle 67 is controlled to control the force exerted by the third roll 24 against the first roll 9.

Pressure control for the recess-forming unit 29 by the first pressure control mechanism 63 allows application of a uniform force (e.g., 200 kg/cm) to the entire surface of the elongated organic film 69 located between the second and first rolls 16 and 9 along its entire width. Furthermore, when the second and third rolls 16 and 24 for biasing the first roll 9, that vertically moves within a range of a desired distance regulated by the sliders 5 and the stoppers (not shown), are controlled by the first and second pressure control mechanisms 53 and 68, deflection in the first roll 9 in the direction of the length can be prevented. In this manner, the first and second pressure control mechanisms 53 and 68 are operated, thereby completing preparation for a recess-forming operation.

Upon completion of the preparation for a recess-forming operation, an ultrasonic wave is applied from an ultrasonic wave generating member (not shown) to the pure water stored in the vessel 72 in the destaticizing mechanism 71. Subsequently, the take-up roll is rotated and at the same time, the driving shaft of a motor (not shown) is rotated, thereby rotating the gears 20 and 28 of the shafts 19 and 27 of the second and third rolls 16 and 24, respectively, meshing with the gears of the driving shaft clockwise. When the second and third rolls 16 and 24 are rotated, the first roll 9 located between the rolls 16 and 24 and biased by the rolls 16 and 24 is rotated counterclockwise. At the same time, an AC voltage is supplied from the AC power supply 38 to the high-voltage transformer 36 through the cable 37 to be voltage-controlled. Thus, a relatively low AC high voltage of, e.g., 3,000 V and 0.26 A is supplied to the flange portions 33 of the supply terminals 34, mounted on the front surfaces of the first boxes 7 through insulation by the insulating cylindrical members 32, through the cables 36a and 36b, thereby supplying the high voltage to the first roll 9 through the supply terminals 34 and the bearings 12 incorporated in the first boxes 7. When the first to third rolls 9, 16, and 24 are rotated and the high voltage is applied to the first roll 9, a large number of recesses are formed in the elongated organic film made of OPP, which passes through between the first and second rolls 9 and 16, and the inner surfaces of the recesses are caused to have affinity.

As shown in FIGS. 2 and 4, the first roll 9 has a structure comprising the copper roll body 11 designed such that a large number of dielectric particles (e.g., synthetic diamond particles) 10 having sharp pointed portions are electrodeposited on the surface of the main body 11 at an area ratio of 70% or more. At the same time, the second roll 16 has a structure comprising the iron roll body 18, the surface of which is covered with the dielectric layer 17. For this reason, when the elongated organic film 69 passes between the first and second rolls 9 and 16, the sharp pointed portions of the large number of synthetic diamond particles 10 on the surface of the first roll 9 press into the elongated organic film 69, thereby forming a plurality of inverted conical recesses 74, as shown in FIG. 6. The first roll 9 to which the AC high voltage is supplied opposes the second roll 16 coated with the dielectric layer 17 through the elongated organic film 69. Thus, corona discharge uniformly generates between the large number of synthetic diamond particles 10 on the surface of the first roll 9, and the dielectric layer 17 of the second roll 16. As a result, as shown in FIG. 6, the elongated organic film 69 pressed by the large number of synthetic diamond particles 10 of the first roll 9 is uniformly irradiated with relatively low energy coronas, thereby causing the inner surfaces of the plurality of recesses 74 formed in the elongated organic film 69 to have affinity.

Since pressure control for the recess-forming unit 29 is performed by the first and second pressure control mechanisms 53 and 68, even if the first roll 9 having a surface precision of several tens $\mu m$ is incorporated in the recess-forming unit 29, a uniform pressure is applied to the elongated organic film 69, passing between the first and second rolls 9 and 16, in the direction of the entire width. Therefore, dynamic external forces, such as vibrations and shocks, acting between the first and second rolls 9 and 16 upon passage of the elongated organic film 69 are absorbed and reduced, and the first to third rolls 9, 16, and 24 are smoothly and continuously rotated. As a result, recess-foring and corona discharge for the elongated organic film 69 by the first roll 9 can be performed uniformly over the entire width.

When the second and third rolls 16 and 24 are vertically moved by the first and second pressure control mechanisms 53 and 68 to bias the first roll 9 which is movably arranged, deflection in the first roll 9 in the direction of the length can be prevented. Thus, recess-forming and corona discharge by the sharp pointed portions of the large number of Synthetic diamond particles 10 deposited on the surface of the first roll 9 are maintained even during a long-term operation.

After the recess-forming operation by the recess-forming unit 29, the elongated organic film 69 is conveyed to pass through the vessel 72 of the destaticizing mechanism 71 by the five feed rolls 70 and the two abutment rolls 73. Since the operation for recess-forming the elongated organic film 69 by the unit 29 is performed by friction and corona discharge between the first and second rolls 9 and 16 and between the first and third rolls 9 and 24, a large amount of electrostatic charge is generated on the surface of the film 69 upon the recess-forming operation, and ambient dust is attracted to the surface of the film 69. The elongated organic film 69 with formed recesses is caused to pass through the vessel 72 which stores pure water in the destaticizing mechanism 71, and at the same time, an ultrasonic wave is applied to the pure water by an ultrasonic wave generating member (not shown), thereby easily removing the dust from the surface of the elongated organic film 69. Subsequently, the elongated organic film 69, after recess-forming and dust removal, is caused to pass through a plurality of hot air blasting members (not shown) to evaporate the water from the surface of the film. The dried film is then taken up by a take-up roll.

In an elongated porous OPP film 76 fabricated in accordance with the method of Example 1 described above, a large number of inverted circular conical recesses 74 having a small average opening width (w) of about 20 $\mu m$ were uniformly formed in the elongated organic film 69 consisting of OPP having a thickness of 20 $\mu m$ at a density of 10,000 per cm$^2$, as shown in FIG. 7, and the inner surface of each recess 74 exhibited affinity. The average thickness of thin portions 75 of the film 69 which are located below the recesses 74 was about 5 $\mu m$.

EXAMPLES 2 AND 3

Two types of elongated porous OPP films each having a structure similar to that obtained in Example 1 were fabricated by following the same procedures as in Example 1 except that the pressure applied to the elongated organic film which was constituted by OPP and which passed between the first and second rolls 9 and 16 was set to 500 kg/cm and 50 kg/cm. The average thickness of the thin portions of the film which are located below the recesses of the elongated porous OPP film and which were obtained by setting the pressure to 500 kg/cm was about 2 $\mu m$, and that of the thin portions of the film which were obtained by setting the pressure to 50 kg/cm was about 10 $\mu m$.

EXAMPLE 4

Example 4 was performed by following the same procedures as in Example 1 except that the pressure to be applied to the elongated organic film which was constituted by OPP and which passed between the first and second rolls 9 and 16 was set to 200 kg/cm and that an AC high power of, e.g., 10 kV and 1.5 A was supplied from the AC power supply 38 and the high voltage transformer.

More specifically, assume that the AC voltage is supplied from the AC power supply 38 of the high-voltage supply mechanism to the high-voltage transformer 36 through the cable to be voltage-controlled, so that a relatively high AC voltage of, e.g., 10 kV and 1.5 A, is supplied to the flange portions of the supply terminals 34, mounted on the front surfaces of the first boxes 7 through insulation by the insulating cylindrical members 32, through the cables 35a and 35b, thereby supplying the high voltage to the first roll 9 through the supply terminals 23 and the bearings 12 incorporated in the first boxes 7. Then, as shown in FIG. 8, high-energy coronas 77 are generated, concentrating at the sharp pointed portions of the synthetic diamond particles 10, thus achieving a so-called edge effect. Due to the edge effect, thin portions 75 of the elongated organic film 69 which are located below the synthetic diamond particles 10 are perforated, thereby forming columnar through pores communicating with the recesses 74 formed in the elongated organic film 69. The columnar through pores have a diameter smaller than the opening width of recesses 74. The inner surfaces of the large number of recesses 74 and the inner surfaces of the through pores formed in the elongated organic film 69 are caused to have affinity by corona discharge. As a result, as shown in FIG. 9, an elongated porous OPP film 79 having the following properties is manufactured. Recesses 74 each having an inner surface exhibiting affinity and a small opening width of about 20 $\mu m$ were formed in the elongated organic film 69 consisting of 20 $\mu m$ thickness OPP at a density of 10,000 recesses/cm$^2$, and columnar through pores 78 each having an inner surface exhibiting affinity and a diameter of 3.5 $\mu m$ are formed in the thin portions 75 of the elongated organic film 69 which are located below the recesses 74. The thin portions 75 have an average thickness of about 5 $\mu m$.

EXAMPLES 5 AND 6

Two types of elongated porous OPP films each having a structure similar to that shown in FIG. 9 were fabricated by following the same procedures as in Example 1 except that the pressure applied to the elongated organic film which was constituted by OPP and which passed between the first and second rolls 9 and 16 was set to 500 kg/cm and 50 kg/cm and that an AC high power of, e.g., 10 kv and 1.5 A was supplied from the AC power supply and the high voltage transformer (neither are shown) to the first roll 9. The average thickness of the thin portions of the film which are located below the recesses of the elongated porous OPP film and which were obtained by setting the pressure to 500 kg/cm was about 2 μm, and that of the thin portions of the film which were obtained by setting the pressure to 50 kg/cm was about 10 μm.

REFERENTIAL EXAMPLES 1 TO 3

Three types of elongated porous OPP films each having a structure similar to that shown in FIG. 7 were fabricated by following the same procedures as in Example 1 except that the pressure applied to the elongated organic film which was constituted by OPP and which passed between the first and second rolls 9 and 16 was set to 200 kg/cm, 500 kg/cm, and 50 kg/cm, and that an AC high power was not supplied from the AC power supply nor the high voltage transformer (neither are shown). Note that the inner surfaces of these elongated porous OPP films were not treated to exhibit affinity since their recesses were not subjected to corona discharge.

The oxygen gas permeation amounts, carbon dioxide gas permeation amounts, and water vapor permeation amounts of the respective elongated porous OPP films obtained in accordance in Examples 1 to 6 and the Referential Examples 1 and 3 each having a thickness of 20 μm were measured. Tables 1 and 2 show the measurement results. Tables 1 and 2 also show the average thickness of the thin portions of the film which are located below the recesses of the respective elongated porous OPP films. Table 2 also includes a Comparative Example showing the measurement results of the oxygen gas permeation amount, a carbon dioxide gas permeation amount, and a water vapor permeation amount of a non-treated OPP film similar to that used in Examples 1 to 6.

TABLE 1

| | Average Thickness (μm) of Thin Portions of OPP Film Which Are Located Below Recesses | Oxygen Gas Permeation Amount[1*] | Carbon Dioxide Gas Permeation Amount[2*] | Water Vapor Permeation Amount[3*] |
|---|---|---|---|---|
| Example 1 | About 5 | $1 \times 10^4$–$5 \times 10^4$ | About $1.5 \times 10^5$ | 20–50 |
| Example 2 | About 2 | $1 \times 10^5$–$5 \times 10^5$ | About $1.5 \times 10^6$ | 60–100 |
| Example 3 | About 10 | $3 \times 10^3$–$8 \times 10^3$ | About $2 \times 10^4$ | 10–50 |
| Example 4 | About 5 | $1 \times 10^7$–$5 \times 10^7$ | About $1 \times 10^8$ | 300–600 |
| Example 5 | About 2 | $1 \times 10^9$–$3 \times 10^9$ | About $1 \times 10^{10}$ | 1200–2000 |
| Example 6 | About 10 | $1 \times 10^6$–$5 \times 10^6$ | About $1 \times 10^7$ | 150–250 |

Unit of oxygen gas permeation[1*] amount: cc/m² · 24 hr · 25° C.
Unit of carbon dioxide gas permeation[2*] amount: cc/m² · 24 hr · 25° C.
Unit of water vapor permeation amount: g/m² · 24 hr · 40° C. · 90% RH

TABLE 2

| | Average Thickness (μm) of Thin Portions of OPP Film Which Are Located Below Recesses | Oxygen Gas Permeation Amount[1*] | Carbon Dioxide Gas Permeation Amount[2*] | Water Vapor Permeation Amount[3*] |
|---|---|---|---|---|
| Referential Example 1 | About 5 | $1 \times 10^4$–$3 \times 10^4$ | About $9 \times 10^4$ | 6–10 |
| Referential Example 2 | About 2 | $1 \times 10^5$–$5 \times 10^5$ | About $2 \times 10^6$ | 10–15 |
| Referential Example 3 | About 10 | $3 \times 10^3$–$5 \times 10^3$ | About $1 \times 10^4$ | 5–8 |
| Comparative Example | — | $2 \times 10^3$ | About $6 \times 10^3$ | 3–5 |

Unit of oxygen gas permeation[1*] amount: cc/m² · 24 hr · 25° C.
Unit of carbon dioxide gas permeation[2*] amount: cc/m² · 24 hr · 25° C.
Unit of water vapor permeation amount: g/m² · 24 hr · 40° C. · 90% RH As is apparent from Tables 1 and 2, the oxygen gas permeation amounts, the carbon dioxide gas permeation amounts, and the water vapor permeation amounts of the elongated porous OPP films of Examples 1 to 6 are greatly increased as compared to those of an ordinary OPP film. Especially, it is apparent that the oxygen gas permeation amount, the carbon dioxide gas permeation amount, and the water vapor permeation amount can be controlled by adjusting the thickness of the thin portions of the OPP film which are located below the recesses, as in the elongated porous OPP films of Examples 1 to 3. Also, it is apparent that the oxygen gas permeation amounts, the carbon dioxide gas permeation amounts, and the water vapor permeation amounts can be controlled by adjusting the thicknesses of the thin portions of the OPP film which are located below the recesses where the through pores are to be formed, as in the elongated porous OPP films of Examples 4 to 6. In addition, it is apparent that in the elongated porous OPP films of Examples 1 to 6, the water vapor permeation amounts can be increased compared to those of Referential Examples 1 to 3 wherein a large number of recesses each having an inner surface not exhibiting affinity are formed, and that above all in the elongated porous OPP films of Examples 4 to 6 in which through pores are formed in the thin portions of the OPP films which are located below the recesses, the water vapor permeation amounts can be remarkably increased.

The elongated porous OPP films of Examples 1 and 4 were used as the fresh fruit and vegetable wrapping materials to each wrap a bunch of spinach, and their opening portions were sealed. For the purpose of comparison, a similar bunch of spinach was wrapped by a wrapping material constituted by ordinary OPP, and its opening portion was sealed. The wrapping materials each containing the bunch of spinach sealed in it were left to stand at room temperature for one week, and the bunches were observed. As a result, the spinach wrapped in the wrapping material of Comparative Example was almost rotten with most of it being yellow. In contrast to this, the spinach wrapped in each of the wrapping materials of Examples 1 and 4 retained its fresh greenish color which was the same as that observed before it was wrapped in the wrapping materials. Especially, since the wrapping material of Example 4 constituted by the porous OPP film released the water vapor generated by the spinach well, fogging or condensation caused by the water vapor was prevented, thus being able to better maintain the freshness.

EXAMPLE 7

Example 7 was performed by following the same procedures as in Example 1 except that a polyethylene terephthalate film (PET film) having a thickness of 50 μm was used as the elongated organic film 69, that a roll obtained by attaching a large number of synthetic diamond particles each having a particle diameter of 30 to 35 μm and sharp pointed portions on the surface of a copper roll body through an electrodeposition layer was used as the first roll 9, and that the elongated organic film 69 was caused to pass between the first and second rolls 9 and 16 and between the first and third rolls 9 and 24 to each of which a controlled pressure was applied.

By causing the elongated organic film to pass between the first and second rolls 9 and 16 and between the second and third rolls 9 and 24 in this manner and by performing a cycle of recess-forming and corona discharge twice, an elongated porous film in which a large number of small recesses having an average opening width of about 10 μm and an average depth of about 10 μm were uniformly formed at a density of about 180,000/cm² was obtained. The inner surface of each recess exhibited affinity.

The wetting tension of the elongated porous PET film obtained in Example 7 was measured. As a result, the wetting tension was 40 dyne/cm or more, and the wettability was considerably improved compared to the ordinary PET film (wetting tension; 35 dyne/cm) in which recesses were not formed. The elongated porous PET film having such high wettability was able to be utilized as a coating film formation base film, on which a coating film such as a magnetic layer containing a magnetic powder is to be formed, or a laminated film.

According to the porous film manufacturing apparatus described above, when the large number of synthetic diamond particles 10 are electrodeposited on the roll body 11 made of copper having a high conductivity through, e.g., the Ni electrodeposition layer, the large number of synthetic diamond particles 10 having a suitable dielectric, hardness, and strength can be firmly deposited on the main body 11 to realize the first roll 9 having high durability. Thus, the manufacturing apparatus incorporating the first roll 9 having this structure can stably perform recess-forming and corona discharge for the elongated organic film 69 over a long period of time.

In addition, when the insulating annular members 8 made of, e.g., a polycarbonate resin, are fitted on the bearings 6 incorporated in the first boxes 7, respectively, the first roll 9 to which the high voltage is supplied can be well insulated from the first boxes 7.

Furthermore, since the pressure acting between the first and second rolls 9 and 16 and the pressure acting between the first and third rolls 9 and 24 of the recess-forming unit 29 are controlled by the first and second pressure control mechanisms 53 and 68, the first to third rolls 9, 16, and 24 can be smoothly rotated at high speed, and the recess-forming performance described above can be greatly improved without forming wrinkles on the elongated organic film 69.

Even if the thickness of the elongated organic film 69 varies, since the film 69 is prevented from being cut in the process of conveying the film 69 between the respective rolls because of an operation similar to that described above, the large number of recesses, each having an inner surface exhibiting affinity, can be continuously formed in the elongated organic film 69.

Furthermore, since the elongated organic film 69 is conveyed to pass through the destaticizing mechanism 71 after a recess-forming operation, a dust-free, easy-to-handle elongated porous film can be taken up by the take-up roll.

According to the porous film manufacturing apparatus described above, each pressure control mechanism is constituted by the cylindrical member, the disk, the coil spring, the pressure sensor, the rod, the disk-like guide, the ball screw, the casing, the worm shaft, and the handle. However, the present invention is not limited to this. For example, the pressure control mechanism can comprise an air cylinder. The pressure sensor as one constituent member of the pressure control mechanism may be omitted. Note that the pressure control mechanism preferably incorporates the sensor in order to perform formation of recess having higher precision.

In the porous film manufacturing apparatus described above, the elongated organic film is conveyed to pass between the first and second rolls and between the first and third rolls to perform recess-forming twice. However, the elongated organic film may be conveyed to pass only either between the first and second rolls or between the first and third rolls.

In the porous film manufacturing apparatus described above, the recess-forming unit comprises the first to third rolls. However, the recess-forming unit may be constituted by the first and second rolls.

Next, another porous film manufacturing apparatus used in Examples 8 and 9 of the present invention will be described with reference to FIGS. 10 to 14.

Figure 11:
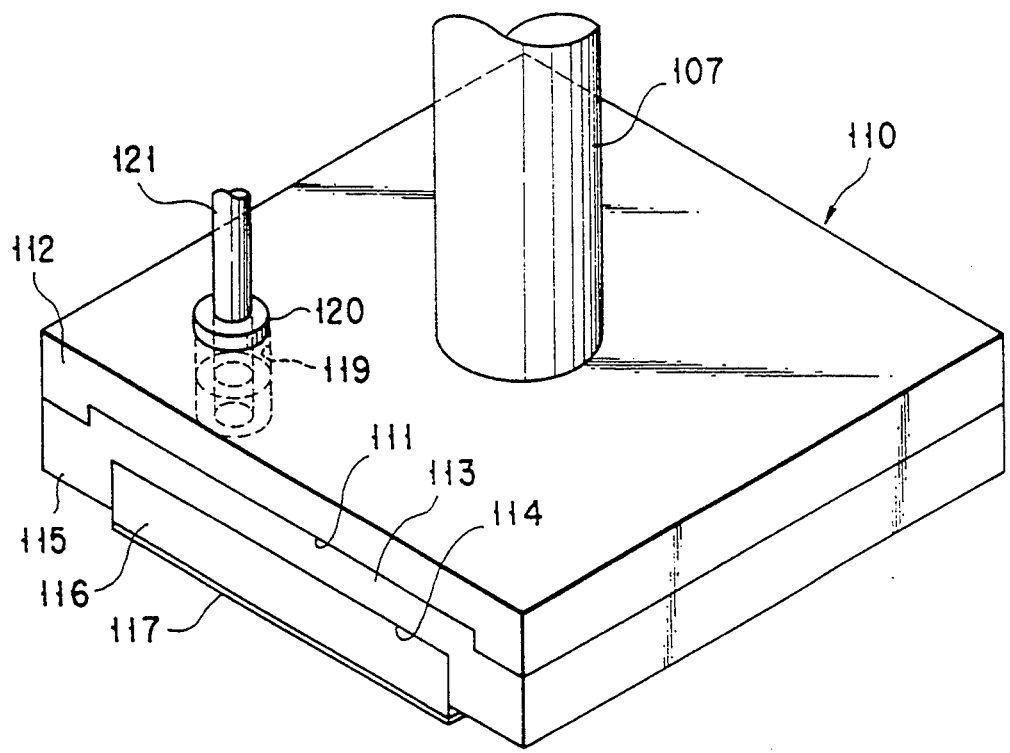
FIG. 11 is a perspective view showing a press mechanism used in the manufacturing apparatus shown in FIG. 10.
Figure 12:
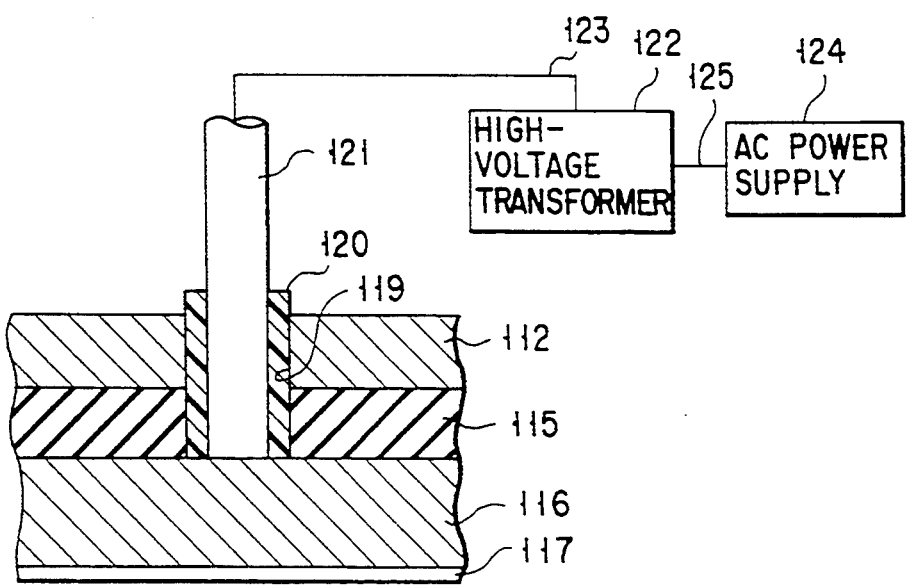
FIG. 12 is a view showing a high-voltage supply mechanism incorporated in the press mechanism shown in FIG. 11.
Figure 13:
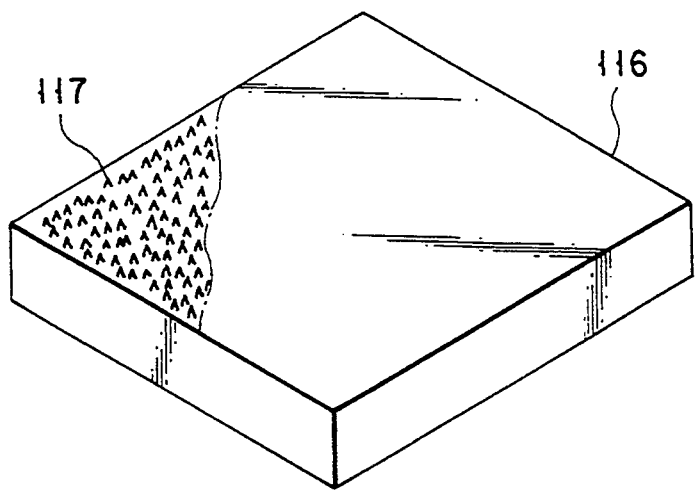
FIG. 13 is a perspective view seen from the lower surface of an electrode body of the press mechanism incorporated in the manufacturing apparatus shown in FIG. 10.
Figure 14:
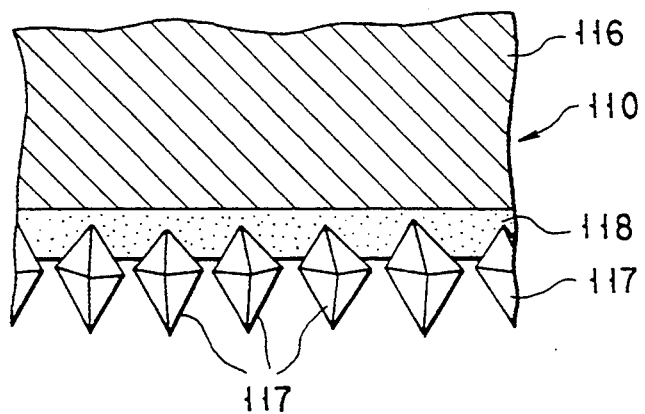
FIG. 14 is an enlarged sectional view of the main part of the electrode body shown in FIG. 13.

FIG. 10 is a schematic sectional view showing a porous film manufacturing apparatus used in Examples 8 and 9 of the present invention, FIG. 11 is a perspective view showing a press mechanism used in the manufacturing apparatus shown in FIG. 10, FIG. 12 is a view showing a high-voltage supply mechanism incorporated in the press mechanism shown in FIG. 11, FIG. 13 is a perspective view seen from the lower surface of an electrode body of the press mechanism incorporated in the manufacturing apparatus shown in FIG. 10, and FIG. 14 is an enlarged sectional view of the main part of the electrode body shown in FIG. 13.

A base 101 comprises a bed 102 and, e.g., an iron rest 103 buried in the upper portion of the bed 102. The rest 103 has a width similar to that (200 mm) of an elongated organic film to be described later. A 3 mm thick dielectric layer 104 made of, e.g., alumina is coated on the upper surface of the rest 103. For example, four support pillars 105 are provided to stand on the bed 102. A support plate 106 is fixed on the four support pillars 105. An air cylinder 108 having a piston rod 107 is supported on the support plate 106, and the piston rod 107 extends downward through a hole 109 formed in the support plate 105.

A press mechanism 110 is detachably mounted on the lower end of the piston rod 107. The press mechanism 110 has the following structure. That is, the press mechanism 110 has an iron body 112 with a belt-like recessed portion 111 formed on its lower surface, as shown in FIGS. 10 and 11. An insulating plate 115 made of, e.g., a polycarbonate resin and having a belt-like protruding portion 113 on its upper surface and a belt-like recessed portion 114 on its lower surface is integrally fixed on the lower surface of the body 112 through an adhesive or the like. A copper electrode body 116 is fixed in the recessed portion 114 on the lower surface of the insulating plate 115 through the adhesive or the like and projects from the lower surface of the insulating plate 115 by a predetermined length. The electrode body 116 has a width similar to that of the elongated organic film to be described later. A large number of synthetic diamond particles 117 as dielectric particles having sharp pointed portions and a Mohs hardness value of 5 or more are deposited on a surface of the electrode body 116 opposing the rest 103 through an electrodeposition layer 118, as shown in FIGS. 13 and 14. The synthetic diamond particles 117 have a particle diameter of, e.g., 50 to 60 $\mu$m and are electrodeposited on the surface of the electrode body 116 at an area ratio of 70% or more.

An electrode terminal guide hole 119 is formed to extend through the body 112 and the insulating plate 115, as shown in FIGS. 11 and 12. An insulating cylindrical member 120 made of, e.g., a polycarbonate resin, is fitted in the hole 119 to project from the surface of the body 112. A high-voltage supply terminal 121 is inserted in the insulating cylindrical member 120, and its distal end is connected to the electrode body 116 exposed to the bottom surface of the hole 119. A high-voltage transformer 122 serving as a high-voltage control member is connected to the terminal 121 through a cable 123, as shown in FIG. 12. An AC power supply 124 is connected to the high-voltage transformer 122 through a cable 125. When the AC high voltage supplied from the AC power supply 124 and voltage-controlled by the high-voltage transformer 122 is supplied to the high-voltage terminal 121 through the cable 123, since the circumferential surface of the supply terminal 121 inserted in the press mechanism 110 is insulated by the insulating cylindrical member 120 from the press body 112, and the distal end of the supply terminal 121 contacts the electrode body 116, the AC high voltage is supplied to only the electrode body 116. The insulating cylindrical member 120, the high-voltage supply terminal 121, the high-voltage transformer 122, the AC power supply 124, and the like constitute the high-voltage supply mechanism.

A winding roll (not shown) serving as the elongated laminated film feed means that moves intermittently is arranged at the inlet of the rest 103. An elongated organic film 126 on the feed roll is fed along the dielectric layer 104 on the upper surface of the rest 103 through two feed rolls, and is wound on a take-up roll (not shown) through two feed rolls 128a and 128b at the outlet of the rest 103.

EXAMPLE 8

A method of manufacturing a porous PE film by performing recess-forming and corona discharge to the elongated organic film 126 consisting of 20 $\mu$m thickness polyethylene (PE) by the porous film manufacturing apparatus having the above-described arrangement will be described with reference to FIGS. 10 to 15.

The elongated organic film 126 is fed from the winding roll (not shown) along the dielectric layer 104 of the rest 103 through the two feed rolls 127a and 127b, and the leading end of the elongated organic film is wound on the take-up roll (not shown) through the two feed rolls 128a and 128b at the outlet of the rest 103.

After the leading end of the elongated organic film is taken up by the take-up roll, the air cylinder 108 is actuated to move the piston rod 107 downward. Thus, the press mechanism 110 mounted on the lower end of the piston rod 107 is moved toward the rest 103 to press the elongated organic film 126 located between the electrode body 116 of the press mechanism 110 and the dielectric layer 104 of the rest 103. At the same time, a high voltage is supplied from the AC power supply 124 to the high-voltage transformer 122 through the cable 125 to be voltage-controlled, thus supplying the relatively low AC voltage of, e.g., 3,000 V and about 0.26 A, is supplied to the electrode body 116 of the press mechanism 110 through the cable 123 and the high-voltage supply terminal 121. By this processing operation, a large number of recesses are formed in the elongated organic film 126 fed to the position between the rest 103 and the electrode body 116 of the press mechanism 110, and the inner surfaces of the recesses are set to have affinity.

More specifically, the press mechanism 110 has a structure in which the large number of synthetic diamond particles 117 having sharp pointed portions are deposited through the electrodeposition layer 118 on a surface of the copper electrode body 116 opposing the rest 103 at an area ratio of, e.g., 70% or more, as shown in FIGS. 11, 13, and 14. The dielectric layer 104 is coated on the surface of the rest 103, as shown in FIG. 10. Hence, when the elongated organic film 126 is pressed between the rest 103 and the electrode body 116 of the press mechanism 110, the sharp pointed portions of many synthetic diamond particles 126 of the electrode body 116 uniformly press into the elongated organic film 126 to perform recess-forming, thus forming a large number of inverted conical recesses 129. At the same time, since the electrode body 116 of the press mechanism 110 to which the AC voltage is supplied opposes the rest 103 covered with the dielectric layer 104 through the elongated organic film 126, corona discharge uniformly generates between the large number of synthetic diamond particles 117 as dielectric particles and the dielectric layer 104 of the rest 103. As a result, as shown in FIG. 15, the inner surfaces of the large number of recesses 129 formed in the elongated organic film 126 are set to have affinity by the corona discharge operation.

After the recess-forming operation and the corona discharge operation are performed, the air cylinder 108 is actuated to move the press mechanism 110 upward, and the elongated organic film 126 is moved for a distance corresponding to the width (a length of a side of the elongated organic film in the moving direction) of the electrode body 116 of the press mechanism 110. Then, similar recess-forming and corona discharge are performed.

In an elongated porous PE film 131 manufactured in accordance with the above method of Example 8, a large number of small inverted circular conical recesses 129 having an average opening width (w) of about 20 $\mu$m were uniformly formed in the elongated organic OPP film 126 having a thickness of 20 $\mu$m, as shown in FIG. 16, and the inner surface of each recess 129 exhibited affinity. The average thickness of thin portions 130 of the film 126 located below the recesses 129 was about 5 $\mu$m. The obtained porous PE film has excellent wettability and thus can be utilized as a coating film formation base film or a laminated film.

EXAMPLE 9

Example 9 was performed by following the same procedures as in Example 8 except that an elastomer film having a thickness of 30 $\mu$m was used as the elongated organic film 126, that the press mechanism 110 obtained by attaching a large number of synthetic diamond particles each having a particle diameter of 60 to 75 $\mu$m and sharp pointed portions on the surface of the copper electrode body 116 through an electrodeposition layer 118 was used as the press mechanism 110, and that an AC high power of, e.g., about 10 kv and about 1.5 A was supplied from the AC power supply 124 to the high voltage transformer 122 to the electrode body 116 of the press mechanism 110.

Figure 17:
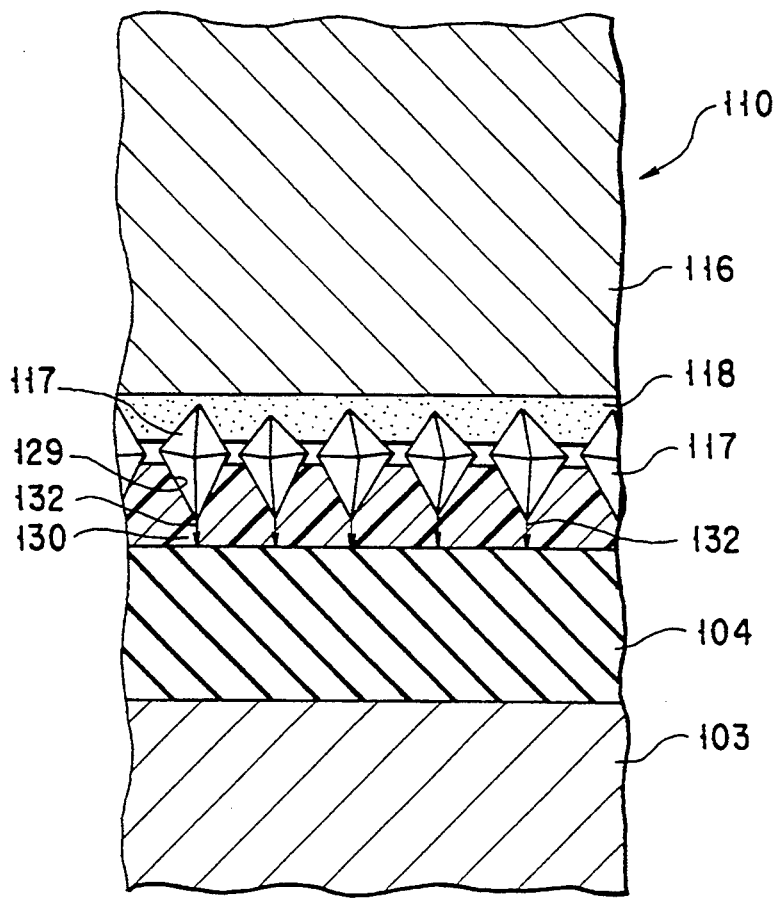
FIG. 17 is an enlarged sectional view of the main part of an elongated organic film for explaining another recess-forming and another corona discharge process in Example 9.
Figure 18:
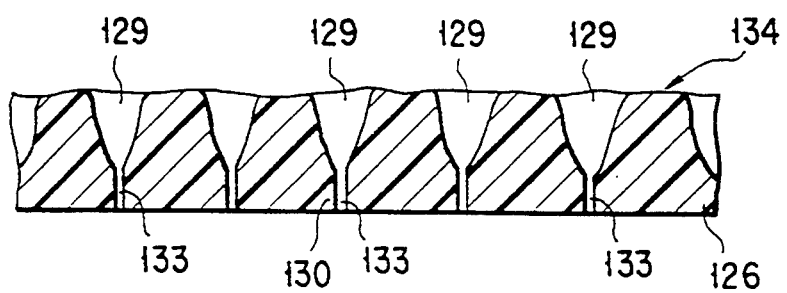
FIG. 18 is an enlarged sectional view of an elongated porous organic film manufactured in Example 9.

More specifically, assume that a high voltage is supplied from the AC power supply 124 of the high-voltage supply mechanism to the high-voltage transformer 122 through the cable 125 to be voltage-controlled, so that a relatively high AC voltage of, e.g., 10 kV and 1.5 A, is supplied to the electrode body 116 of the press mechanism 110 through the cables 123 and the high-voltage supply terminal 121. Then, as shown in FIG. 17, high-energy coronas 132 are generated, concentrating at the sharp pointed portions of the synthetic diamond particles 117, thus achieving a so-called edge effect. Due to the edge effect, thin portions 130 of the elongated organic film 126 which are located below the synthetic diamond particles 117 are perforated, thereby forming columnar through pores communicating with the recesses 129 formed in the elongated organic film 126. The columnar through pores have a diameter smaller than the opening width of the recess 129. The inner surfaces of the large number of recesses 129 and the inner surfaces of the through pores formed in the elongated organic film 126 are caused to have affinity by corona discharge. As a result, as shown in FIG. 18, an elongated porous elastomer film 134 having the following properties is manufactured. Recesses 129 each having an inner surface exhibiting affinity and a small opening width of about 30 $\mu$m are formed in the elongated organic film 126 consisting of 30 $\mu$m thickness elastomer of a density of 10,000 recesses/cm$^2$, and columnar through pores 133 each having an inner surface exhibiting affinity and an average diameter of 3 $\mu$m are formed in the thin portions 130 of the elongated organic film 126 which are located below recesses 129. The thin portions 130 have an average thickness of about 5 $\mu$m.

The water vapor permeation amount of the porous elastomer film 134 obtained in Example 9 was measured. The water vapor permeation amount was 2,000 g/m$^2$.24 hr.40° C.90%RH, and much greater than the water vapor permeation amount; i.e., 300 g/m$^2$.24 hr.40° C.90%RH, in the non-treated elastmer film used in Example 9. The porous elastomer film having such a high water vapor permeation amount was able to be utilized as a medical material of, e.g., a base film for a sweating preventive cataplasm, gloves for surgical operations, and the like.

According to the porous film manufacturing apparatus described above, when the large number of synthetic diamond particles 117 are electrodeposited on the electrode body 11 made of copper having high conductivity through the electrodeposition layer 118, the large number of synthetic diamond particles 117 having hardness and strength can be firmly deposited on the electrode body 116 to realize the press mechanism 110 having considerably high durability. Thus, the manufacturing apparatus incorporating the press mechanism 110 can stably perform recess-forming and corona discharge for the elongated organic film 126 over a long period of time.

When the press mechanism 110 having the electrode body 116 of a relatively small size identical to the size of the final product (e.g., a wrapping material for a deoxidant or drying agent) is used, the smoothness precision of the surface of the electrode body 116 on which the large number of synthetic diamond particles 117 are deposited can be improved. As a result, the distance (gap) between the dielectric layer 104 of the rest 103 and the electrode body 116 in the process of applying pressure to the elongated organic film 126 can be set at a remarkably high precision. Thus, the large number of recesses having uniform depths can be formed in the elongated organic film 126 at a high reproducibility, and the inner surfaces of the recesses can be set to have high affinity.

As has been described above, according to the present invention there is provided a porous organic film having good wettability, a function of suppressing or preventing permeation of water, bacteria, and viruses, desired amount of the gas permeation and desired amount of water vapor permeation (especially high water vapor permeation amount) by allowing permeation of a gas such as the oxygen gas and the carbon dioxide gas and the water vapor, and the like. Hence, this porous organic film can be effectively Utilized as a gas selective permeation filter or the like, in addition to a coating film formation base film, a laminated film, various types of wrapping materials, e.g., a fresh fruit and vegetable wrapping material and a deoxidant wrapping material, an expandable base film for a cataplasm, and gloves for surgical operations which are described above.

According to the present invention, there is provided a manufacturing apparatus capable of manufacturing, on a mass production line, a porous film in which a large number of (e.g., 500 to 200,000 per cm$^2$) recesses, each having a small opening width arbitrarily selected in the range of sub-$\mu$m to 300 $\mu$m and an inner surface exhibiting affinity, can be uniformly formed in various types of the elongated organic film, e.g., a polymeric film or a laminated film, with almost no deterioration in essential properties of the film materials (e.g., transparency, softness, strength, and the like), and which is suitable as an element of a function film, e.g., a coating film formation base film, various types of gas filters, a medical material, a fresh fruit and vegetable wrapping material, and the like.

In addition, according to the present invention, there is provided a manufacturing apparatus capable of manufacturing, on a mass production line, a porous film in which a large number of (e.g., 500 to 200,000 per cm$^2$) recesses, each having a small opening width arbitrarily selected in the range of sub-$\mu$m to 300 $\mu$m and an inner surface exhibiting affinity, and through pores formed in the recesses to be contiguous to the bottom portions and each having a diameter smaller than the opening width of each recessed portion, can be uniformly formed in various types of the elongated organic film, e.g., a polymeric film or a laminated film, with almost no deterioration in essential properties of the film materials (e.g., transparency, softness, strength, and the like), and which is suitable as an element of a function film, e.g., a coating film formation base film, various types of gas filters, a medical material, a fresh fruit and vegetable wrapping material, and the like.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A porous film manufacturing apparatus comprising:

feed means for feeding an organic film;

a base made of a conductive material and having a dielectric layer formed on a surface thereof where the organic film is fed;

press means arranged to be movable to press the organic film together with said base and having an electrode body on which a large number of dielectric particles, each having sharp pointed portions and a Mohs hardness value of 5 or more, are formed on a surface thereof opposing said base;

driving means for moving said press means to said base, thereby pressing the organic film located between said base and said press means; and high-voltage supply means for supplying a high voltage to said electrode body of said press means.

2. The apparatus according to claim 1, wherein the organic film is an elongated organic film.

3. The apparatus according to claim 1, wherein the organic film has a size of a final product.

4. The apparatus according to claim 1, wherein said dielectric particles are synthetic diamond particles electrodeposited on said electrode body.

5. The apparatus according to claim 1, wherein said dielectric layer is made of a ceramic.

6. The apparatus according to claim 1, wherein said surface of said electrode body on which said dielectric particles are deposited is flat.

7. The apparatus according to claim 3, wherein said surface of said electrode body on which said dielectric particles are deposited forms a curved surface coinciding with a shape of the organic film having the size of the final product.

8. The apparatus according to claim 7, wherein said surface of said base on which said dielectric layer is formed forms a curve to coincide with said curved surface of said electrode body on which said dielectric particles are deposited.

9. The apparatus according to claim 1, wherein said press means comprises a body made of a metal material, an insulating plate fixed on a surface of said body opposing said base, and said electrode body, fixed to said insulating plate, on which said large number of dielectric particles are deposited on a surface thereof facing said base.

* * * * *

UNITED STATES PATENT AND TRADEMARK OFFICE
CERTIFICATE OF CORRECTION

PATENT NO. : 5,451,257
DATED : 19 September 1995
INVENTOR(S) : Seiji KAGAWA et al.

It is certified that error appears in the above-identified patent and that said Letters Patent is hereby corrected as shown below:

| Column | Line | |
|---|---|---|
| 4 | 33 | Change "oxygen and carbon" to --oxygen, carbon--. |
| 4 | 34 | Before "water" insert --and--. |
| 4 | 50 | Change "$0^3$ to $10^7$ cc/m$^2$ 24 hr.25° C." to --$10^3$ to $10^7$ cc/m$^2 \cdot$ 24 hr $\cdot$ 25°C.-- |
| 13 | 66 | Change "permiate" to --permeate--. |
| 15 | 12 | After "addition" insert --to--. |
| 15 | 52 | Change "has a high withstand" to --can withstand a high--. |
| 15 | 53 | After "and" insert --has--. |

UNITED STATES PATENT AND TRADEMARK OFFICE
CERTIFICATE OF CORRECTION

PATENT NO. : 5,451,257

DATED : 19 September 1995

INVENTOR(S) : Seiji KAGAWA et al.

It is certified that error appears in the above-identified patent and that said Letters Patent is hereby corrected as shown below:

| Column | Line | |
|---|---|---|
| 16 | 63 | After "thereof" insert --,--. |
| 18 | 38 | Change "permiate" to --permeate--. |
| 20 | 61 to | |
| 21 | 3 | Delete in its entirety. |
| 23 | 8 | After "in" insert --its--. |
| 27 | 21 | Change "recess-foring" to --recess-forming--. |
| 27 | 30 | Change "Synthetic" to --synthetic--. |
| 27 | 61 | Change "(w)" to --(W)--. |
| 29 | 34 | After "accordance" change "in" to --with--. |
| 29 | 67 | After "permeation" insert --$^{3*}$--. |

UNITED STATES PATENT AND TRADEMARK OFFICE
CERTIFICATE OF CORRECTION

PATENT NO. : 5,451,257

DATED : 19 September 1995

INVENTOR(S) : Seiji KAGAWA et al.

It is certified that error appears in the above-identified patent and that said Letters Patent is hereby corrected as shown below:

| Column | Line | |
|---|---|---|
| 30 | 24 | After "permeation" insert --$^{3*}$--. |
| 31 | 41 | After "or": insert --as--. |
| 34 | 62 | Change "(w)" to --(W)--. |
| 35 | 54 | Change g/m$^2$.24 hr.40° C.90%RH," to --g/m$_2$ • 24 hr • 40°C • 90% RH,--. |
| 35 | 55 | Change "g/m$^2$.24" to --g/m$^2$ • 24--. |
| 35 | 56 | Change "hr.40° C.90%RH," to --hr • 40°C • 90% RH,--. |
| 36 | 31 | Change "Utilized" to --utilized--. |

Signed and Sealed this

Thirtieth Day of April, 1996

Attest:

BRUCE LEHMAN

Attesting Officer    Commissioner of Patents and Trademarks